(12) United States Patent
Druchinin

(10) Patent No.: US 9,404,648 B2
(45) Date of Patent: Aug. 2, 2016

(54) LED LIGHT WITH COOLING SYSTEM

(71) Applicant: Vitaly Druchinin, Arlington, WA (US)

(72) Inventor: Vitaly Druchinin, Arlington, WA (US)

(73) Assignee: Chilled Tech, LLC, Arlington, WA (US)

( * ) Notice: Subject to any disclaimer, the term of this patent is extended or adjusted under 35 U.S.C. 154(b) by 202 days.

(21) Appl. No.: 14/156,272

(22) Filed: Jan. 15, 2014

(65) Prior Publication Data
US 2015/0198321 A1  Jul. 16, 2015

(51) Int. Cl.

| | | |
|---|---|---|
| F21V 29/00 | (2015.01) | |
| F21V 29/02 | (2006.01) | |
| F21V 23/04 | (2006.01) | |
| H05B 37/02 | (2006.01) | |
| H05B 33/08 | (2006.01) | |
| F21K 99/00 | (2016.01) | |
| F21V 29/56 | (2015.01) | |
| F21V 29/67 | (2015.01) | |
| F21V 29/76 | (2015.01) | |
| A01G 9/26 | (2006.01) | |
| F21Y 101/02 | (2006.01) | |
| F21Y 105/00 | (2016.01) | |

(52) U.S. Cl.
CPC . *F21V 29/30* (2013.01); *A01G 9/26* (2013.01); *F21K 9/00* (2013.01); *F21V 23/04* (2013.01); *F21V 29/02* (2013.01); *F21V 29/22* (2013.01); *F21V 29/56* (2015.01); *F21V 29/67* (2015.01); *F21V 29/763* (2015.01); *H05B 33/0803* (2013.01); *H05B 33/089* (2013.01); *H05B 37/0254* (2013.01); *F21Y 2101/02* (2013.01); *F21Y 2105/001* (2013.01)

(58) Field of Classification Search
CPC ......... F21V 29/30; F21V 29/50; F21V 29/51; F21V 9/56; F21V 29/025; F21V 29/2212; F21V 29/02; F21V 29/503
See application file for complete search history.

(56) References Cited

U.S. PATENT DOCUMENTS

| | | | | |
|---|---|---|---|---|
| 4,196,544 | A * | 4/1980 | Davis | A01G 7/045 165/47 |
| 5,199,784 | A * | 4/1993 | Hempleman | A01G 9/247 362/294 |
| 2004/0257538 | A1* | 12/2004 | Kondo | G03B 21/16 353/54 |
| 2008/0062694 | A1* | 3/2008 | Lai | F21V 29/30 362/294 |
| 2012/0063116 | A1* | 3/2012 | Baxter | F21V 5/045 362/6 |
| 2012/0294002 | A1* | 11/2012 | Igl | F21V 29/006 362/249.01 |

* cited by examiner

*Primary Examiner* — Karabi Guharay
(74) *Attorney, Agent, or Firm* — Jensen & Puntigam, PS

(57) ABSTRACT

Technologies related to light fixtures, cooling systems, electronic controllers for light fixtures, methods of manufacture, and methods for operating light fixtures are described herein. Example light fixtures may include Light Emitting Diode (LED) light fixtures equipped with cooling systems. Example cooling systems may comprise liquid cooling systems, duct cooling systems, fan cooling systems, and combinations thereof. Example light fixtures may furthermore include switches and a local controller for controlling the light fixture.

22 Claims, 13 Drawing Sheets

LED LIGHT WITH COOLING SYSTEM

BACKGROUND

Advances in Light Emitting Diode (LED) technologies are driving development of new products which were not previously possible or economical. One example is the LED grow light, for use in greenhouses to provide light for plant growth. In greenhouses and other settings where lights are used intensively, lights and electricity costs present a significant operating cost.

Modern LEDs have remarkable reliability and energy efficiency, as well as the appropriate output frequency ranges and sufficient intensity to stimulate plant growth. As a result, LED grow lights have the potential to produce meaningful cost savings over time. Of course, the extent of such cost savings over competing lighting technologies may vary, and the extent of the cost savings is an important factor in choosing a lighting technology to invest in. Light fixture designs and supporting systems are needed which extend the reliability and energy efficiency of light fixtures, while allowing for large-scale deployments, and while balancing the up-front and downstream costs to reduce the overall cost of ownership, operation and maintenance insofar as practical.

SUMMARY

Technologies including light fixtures, cooling systems, electronic controllers for light fixtures, methods of manufacture, and methods for operating light fixtures are described herein. Some example light fixtures may comprise LED light fixtures equipped with a cooling system. An LED light fixture may include a light fixture housing and at least one LED lighting module within the light fixture housing. The LED lighting module(s) may comprise, e.g., a heat sink, a Printed Circuit Board (PCB), LEDs affixed to the PCB, and a lens covering the LEDs. The light fixture housing may comprise opening(s) for the lens(es) of the LED lighting module(s). Example LED light fixtures may furthermore include at least one driver within the light fixture housing, where the driver(s) are electronically coupled with the LED lighting module(s), and a power input interface electronically coupled with the driver(s).

Example LED light fixtures may furthermore include a cooling system. Some example cooling systems may comprise one or more of a liquid cooling system, a duct cooling system, and/or a fan cooling system, as described herein. Some example cooling systems may include two or more of the liquid, duct, and/or fan cooling systems. Some example cooling systems may include each of the liquid, duct, and fan cooling systems.

Example liquid cooling systems may comprise a watertight liquid cooling manifold within the light fixture housing. The liquid cooling manifold may comprise at least one liquid cooling conduit, a liquid intake fitting, and a liquid expulsion fitting. The light fixture housing may comprise an opening for the liquid intake fitting and an opening for the liquid expulsion fitting. Example liquid cooling manifolds may be arranged so that when the liquid intake and liquid expulsion fittings are positioned at corresponding openings in the light fixture housing, the at least one liquid cooling conduit is in thermal communication with the heat sink(s) of the LED lighting module(s).

Example liquid cooling manifolds may comprise first and second transport conduits, each with a proximal end and a distal end. The first and second transport conduits may be arranged in parallel. The liquid intake fitting may be positioned at the proximal end of the first transport conduit, and the liquid expulsion fitting may be positioned at the distal end of the second transport conduit. Liquid cooling conduits may connect the first and second transport conduits so that liquid entering the manifold at the liquid intake fitting travels through the liquid cooling conduits to the liquid expulsion fitting. When two or more liquid cooling conduits are used, liquid entering the manifold at the liquid intake fitting may travel a same distance to the liquid expulsion fitting via any of the liquid cooling conduits. A diameter of the first and second transport conduits may be larger than a diameter of the two or more liquid cooling conduits.

In some embodiments, liquid cooling conduit(s) may be in thermal communication with the heat sink(s) of the LED lighting module(s) by contact between an outer surface of the liquid cooling conduit(s) and a groove traversing a center section of the heat sink(s). A diameter of the groove may substantially match a diameter of the outer surface of the liquid cooling conduit(s). The liquid cooling conduit(s) may be made of material with good thermal transfer properties, such as copper. Liquid cooling conduit(s) may be in thermal communication with multiple heat sinks of a corresponding multiple LED lighting modules.

Example duct cooling systems may comprise a ventilation duct extending from a side of the light fixture housing, wherein the ventilation duct may be adapted to couple with the light fixture housing in a substantially horizontal orientation as well as in a substantially vertical orientation. The ventilation duct may comprise, e.g., an L bracket interface which adapts the ventilation duct to couple with the light fixture housing in the substantially horizontal orientation as well as in the substantially vertical orientation. In some embodiments, the ventilation duct may comprise at least one internal divider to separate air flow into two or more channels, and the light fixture housing may also comprise at least one internal divider to maintain air flow, within the LED light fixture, in the two or more separate channels established at the ventilation duct. In some embodiments, the ventilation duct may comprise a ventilation duct attachment adapted to attach to the light fixture housing in place of at least one removable side panel of the light fixture housing.

Example fan cooling systems may comprise at least one fan within the light fixture housing, wherein the light fixture housing comprises an opening over the at least one fan, wherein the at least one fan is positioned substantially above the heat sink of at least one LED lighting module, and wherein the light fixture housing comprises one or more openings along at least one side of the light fixture housing to allow air flow from the opening over the at least one fan, across the heat sink, and out the one or more openings along at least one side of the light fixture housing. In some embodiments, a plurality of fans may be arranged in an axial row of fans across a middle section of the light fixture housing. Internal divider(s) may separate air flow from the plurality of fans into different channels within the light fixture housing.

Example LED light fixtures may furthermore include a plurality of switches, such as an on/off switch for turning the LED light fixture on and off; a fan on/off switch for turning one or more fans within the LED light fixture on and off; a power output switch for switching the LED light fixture between a low power state and a high power state; a first frequency composition switch for switching the LED light fixture between a white light mode and a grow light mode; and a second frequency composition switch for switching the LED light fixture between a blue biased vegetative growth mode and a red biased flowering mode.

Example LED light fixtures may furthermore include a local controller. The local controller may be electronically coupled with the driver(s), as well as with a communications interface adapted to receive a communications cable. The local controller may be adapted to control the LED light fixture responsive to instructions received from an external controller via the communications cable, and the local controller may be adapted provide status information for the LED light fixture to the external controller via the communications cable.

In some embodiments, the communications interface may comprise an input interface and an output interface, and the communications cable may comprise an input cable and an output cable. The local controller may be adapted to control the LED light fixture responsive to instructions received from the external controller via the input cable and input interface, and the local controller may be adapted provide status information for the LED light fixture to the external controller via the output interface and output cable. In arrangements supporting multiple lights connected in series, the local controller may be adapted to receive status information for one or more other LED light fixtures via the input cable and input interface, and the local controller may be adapted to relay the instructions received from the external controller, as well as status information for the one or more other LED light fixtures, via the output interface and output cable.

Example local controllers may be adapted to automatically turn off the LED light fixture in response to a high temperature in the LED light fixture, and to automatically notify the external controller of the high temperature in the LED light fixture. Example local controllers may be adapted to automatically override one or more local switch settings using the instructions received from the external controller. Example instructions received from the external controller comprise instructions to turn the LED light fixture on or off; apply a designated frequency composition; and/or apply a designated power output level, and example local controllers may be adapted to control the LED light fixture responsive to such instructions. Other advantages and features of the invention are described below.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Certain specific details are set forth in the following description and figures to provide a thorough understanding of various embodiments of the invention. Certain well-known details are not set forth in the following disclosure, however, to avoid unnecessarily obscuring the various embodiments of the invention. Further, those of ordinary skill in the relevant arts will understand that they can practice other embodiments of the invention without one or more of the details described below. Finally, while various methods may be described with reference to steps and sequences in the following disclosure, the description as such is for providing a clear implementation of embodiments of the invention, and steps and sequences of steps should not be taken as required to practice this invention.

Disclosed herein are, inter alia, technologies including light fixtures, cooling systems, electronic controllers for light fixtures, methods of manufacture, and methods for operating light fixtures. Example light fixtures may include LED light fixtures equipped with cooling systems. Example cooling systems may comprise liquid cooling systems, duct cooling systems, fan cooling systems, and combinations thereof. Example light fixtures may furthermore include switches for controlling the light fixture, as described herein, as well as local controllers for controlling the light fixture with an external controller, wherein the external controller may simultaneously control multiple light fixtures.

Figure 1:
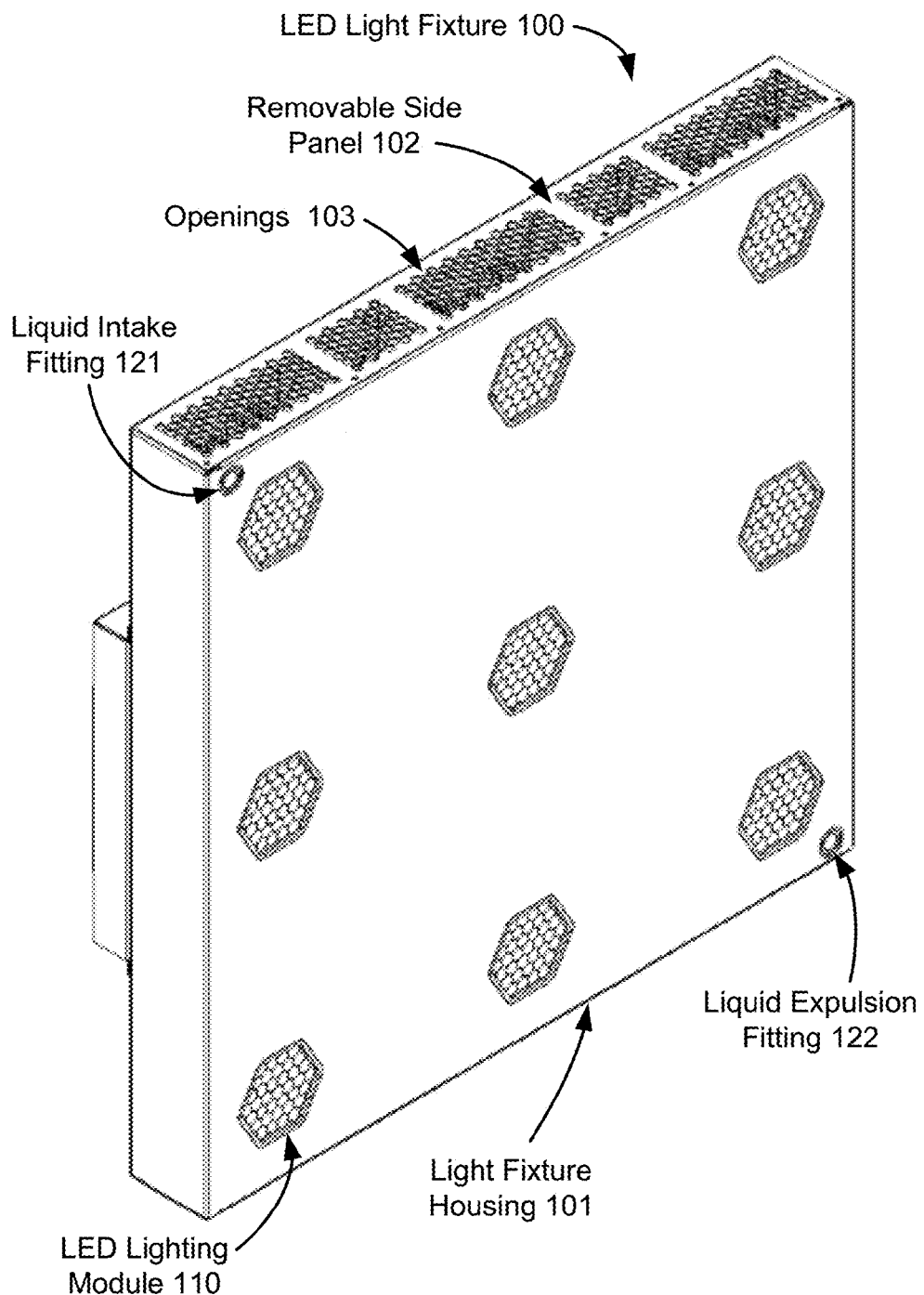
FIG. 1 illustrates a bottom view of an example LED light fixture.

FIG. 1 illustrates a bottom view of an example LED light fixture. LED light fixture 100 includes a light fixture housing 101. Light fixture housing 101 houses, inter alia, LED lighting modules such as LED lighting module 110, and light fixture housing 101 comprises openings for the LED lighting modules. Light fixture housing 101 includes a removable side panel 102 with openings 103 for air flow through the light fixture housing 101. Removable side panel 102 may be removed from light fixture housing 101 to optionally attach a ventilation duct to light fixture housing 101. Light fixture housing 101 also comprises openings for a liquid intake fitting 121 and a liquid expulsion fitting 122.

LED light fixture 100 is an example light fixture, and it will be appreciated that cooling system features, as well as other technologies disclosed herein, may be applied in other lights, including non-LED lights in some embodiments. LED light fixture 100 may preferably be made of high quality components and durable materials with a goal of minimizing replacement, maintenance, and energy costs, to minimize the long-term costs of ownership of LED light fixture 100.

In some embodiments, LED light fixture 100 may be adapted for multi-light deployments involving, e.g., 5, 10, 50, 100 or more LED light fixtures deployed in environments such as greenhouses, warehouses, or other commercial settings. LED light fixture 100 may be adapted with hooks, hangers, mounts, or other hardware (not shown in FIG. 1) for hanging LED light fixture 100 from a ceiling, and optionally allowing for adjusting the desired height of LED light fixture 100. LED light fixture 100 may include a power input interface (not shown in FIG. 1) for connecting the LED light fixture 100 to electrical power, e.g., as may be supplied by one or more overhead electrical power circuits having appropriate voltage and current to provide electrical power to multiple LED light fixtures.

To facilitate multi-light deployment, embodiments of LED light fixture 100 may implement communications technologies which allow for multiple lights to be connected "in series", wherein, for example, a communications cable may connect an external controller to a first light, another communications cable may connect the first light and a second light, another communications cable may connect the second light and a third light, and so on. The external controller and lights may be adapted in a manner allowing the external controller to control all of the lights thus connected, as will be described further herein. Such arrangements may simplify multi-light deployments in part by avoiding large numbers of cables for separately connecting the external controller to each light.

To facilitate multi-light deployment, embodiments of LED light fixture 100 may implement cooling systems that may be extended across multiple lights. For example, liquid cooling systems may be adapted to accommodate sufficient liquid flow to cool multiple lights in a multi-light liquid cooling circuit. Liquid intake and expulsion fittings may be positioned and oriented in a manner that facilitates connections between multiple lights in a multi-light liquid cooling circuit. Duct cooling systems may be adapted to accommodate sufficient air flow to cool multiple lights in a multi-light duct cooling circuit. Duct attachments may be positioned and oriented in a manner that facilitates connections between multiple lights in a multi-light duct cooling circuit. Fans and openings for fan-generated air flow may also optionally be positioned and oriented in a manner that facilitates air flow across multiple lights in a multi-light deployment.

In some embodiments, LED light fixture 100 may be arranged to accommodate any one of the cooling systems described herein. In other embodiments, LED light fixture 100 may be arranged to accommodate any combination of the cooling systems described herein. LED light fixture 100 may comprise removable side panels such as 102, and other elements described herein, to accommodate a duct cooling system. LED light fixture 100 may comprise openings such as openings 103 and a fan housing/fan openings (illustrated in FIG. 2), and other elements described herein, to accommodate a fan cooling system. LED light fixture 100 may comprise openings for a liquid intake fitting 121 and a liquid expulsion fitting 122, and other elements described herein, to accommodate a liquid cooling system.

Embodiments arranged to accommodate multiple different cooling systems may, but need not, actually include all of the cooling systems which LED light fixture 100 is arranged to accommodate. Manufacturing methods may include, for example, receiving customer cooling system selections and configuring LED light fixtures with customer selected cooling systems, while optionally omitting those cooling systems not selected by the customer. If, for example, the customer does not wish to use the liquid or fan cooling systems, lights manufactured for the customer may be made at less cost by omitting those systems, while including, e.g., duct attachments for using the duct cooling system in connection with the LED light fixture 100. In another example, the liquid and fan cooling systems may be included while duct attachments may be omitted. LED light fixture 100 may thus include the duct cooling system, fan cooling system, and liquid cooling system, or LED light fixture 100 may include any subset of these cooling systems.

Figure 2:
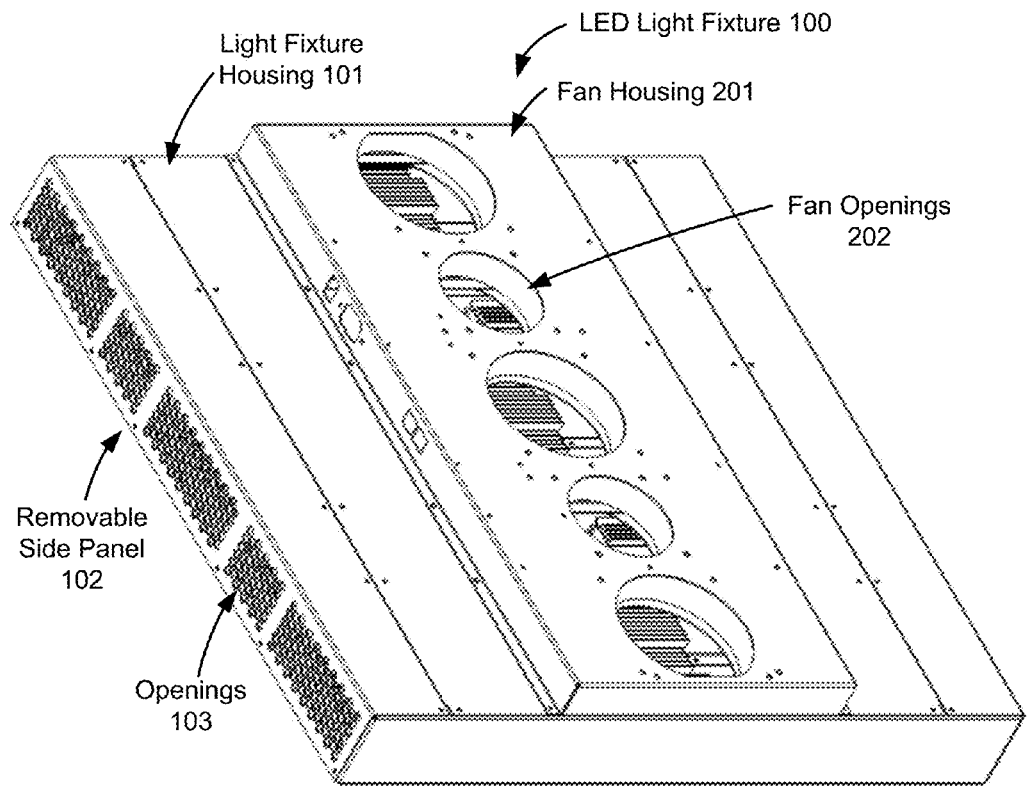
FIG. 2 illustrates a top view of an example LED light fixture.

FIG. 2 illustrates a top view of an example LED light fixture. FIG. 2 illustrates the LED light fixture 100 from FIG. 1, and the light fixture housing 101, removable side panel 102, and openings 103 illustrated in FIG. 1 are also visible in FIG. 2. FIG. 2 illustrates a fan housing 201 comprising fan openings 202. Fan housing 201 may be integrated with light fixture housing 101, e.g., by being permanently affixed to the top of the light fixture housing 101 as shown, and light fixture housing 101 may comprise fan openings underneath fan openings 202, to permit air flow through fan openings 202 and into the inside of the light fixture housing 101.

It will be appreciated that fans (not shown in FIG. 2) may be positioned within the light fixture housing 101, e.g., in the fan openings 202 within the fan housing 201. The fans may thus be positioned substantially above the heat sinks of the LED lighting modules within the LED light fixture 100. Fan openings 202 may provide openings over the fans whence air may be drawn into (or alternatively, expelled from) the light fixture housing 101. The light fixture housing 101 comprises openings 103 along at least one side of the light fixture housing 101 to allow air flow from the fan openings 202, across the heat sinks of the LED lighting modules within the light fixture housing 101, and through the openings 103 along at least one side of the light fixture housing 101. Air flow through the light fixture housing 101 generated by operation of the fans may flow in either direction, that is, air may enter the light fixture housing 101 at the fan openings 202 and exit through the openings 103, or vice versa.

Figure 6:
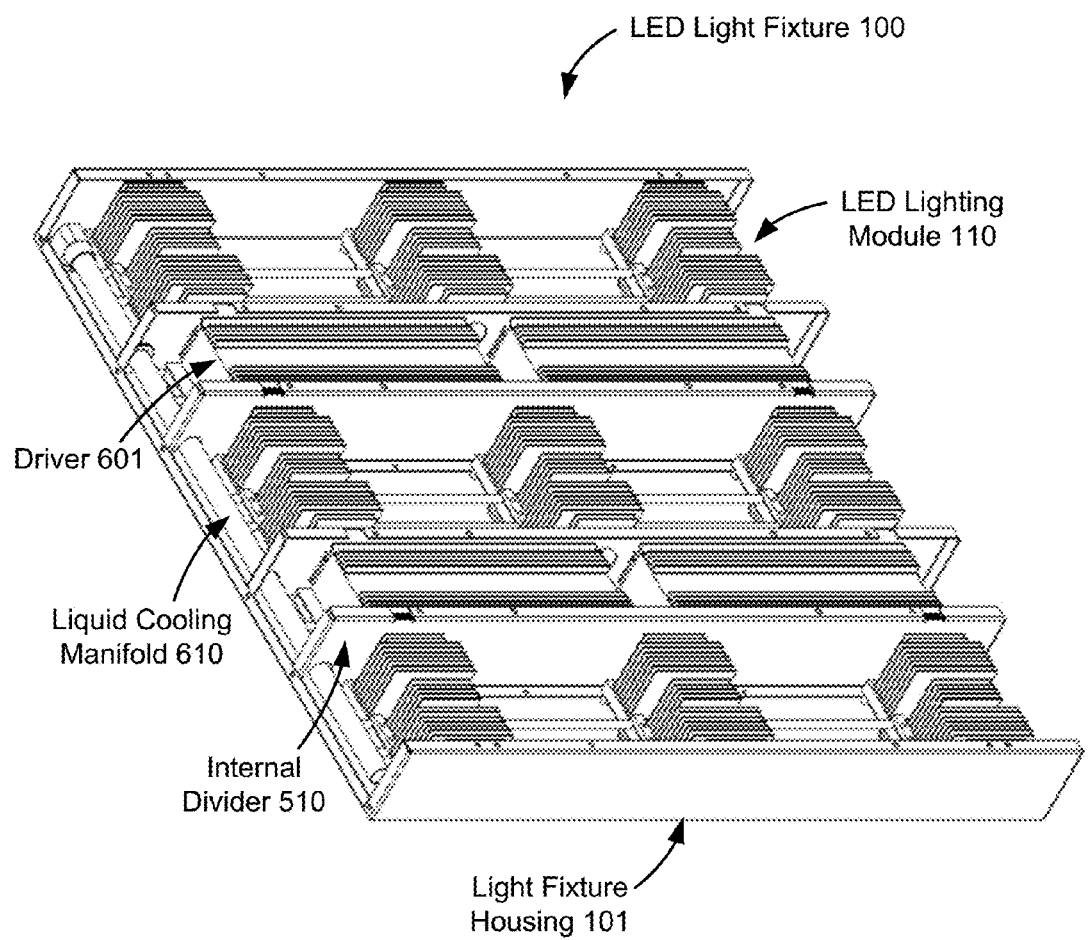
FIG. 6 illustrates a top view of internals of an example LED light fixture.

In some embodiments, LED light fixture 100 may comprise a plurality of fans within the light fixture housing 101 as shown by the multiple fan openings 202 in FIG. 2. Furthermore, embodiments may arrange the fans in an axial row of fans across a middle section of the light fixture housing 101, as also shown in FIG. 2. FIG. 2 illustrates an axial row of five fans (one fan for each illustrated fan opening), wherein larger diameter fans are over each of three rows of LED lighting modules within the light fixture housing 101 shown in FIG. 6, and wherein smaller diameter fans are over each of two rows of drivers within the light fixture housing 101, as also shown in FIG. 6.

Figure 3:
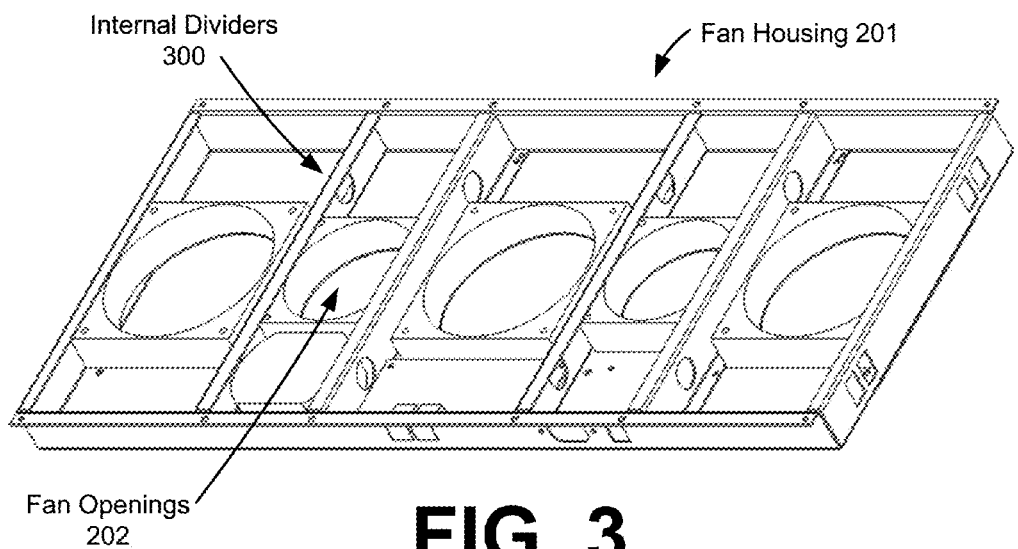
FIG. 3 illustrates a bottom view of an example fan housing.
Figure 5:
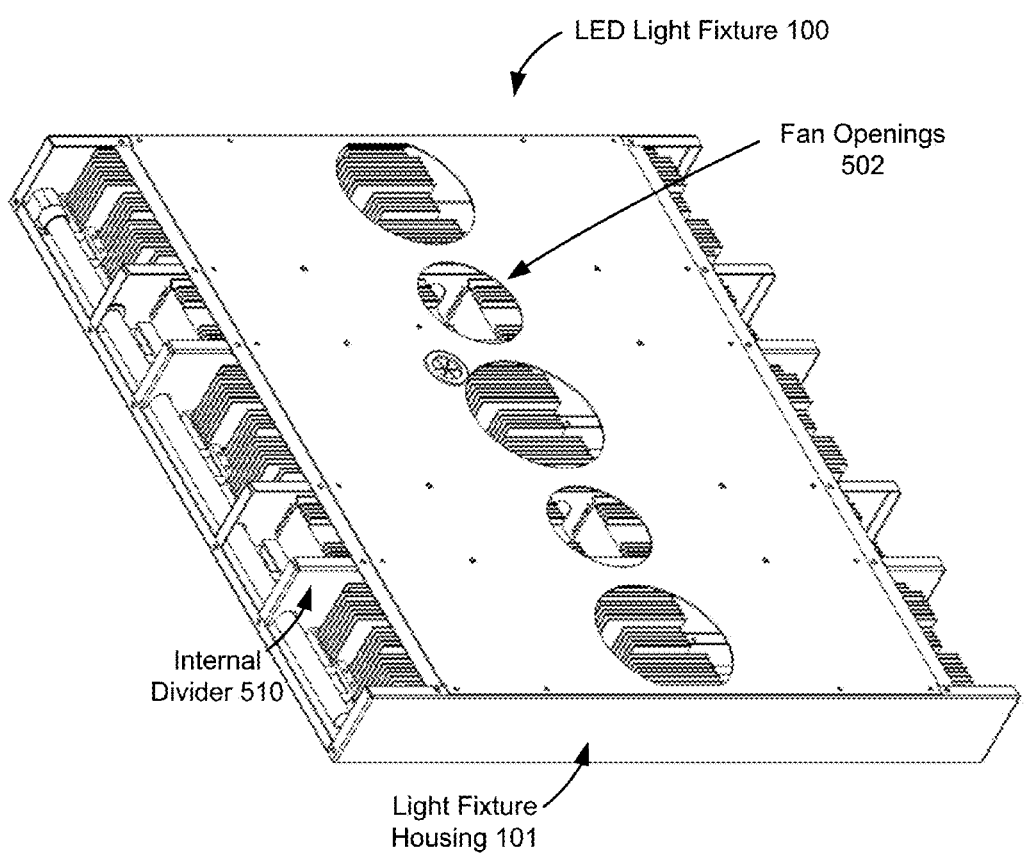
FIG. 5 illustrates a top view of an example LED light fixture.

FIG. 3 illustrates a bottom view of an example fan housing. Fan housing 201 may comprise fan openings 202, as illustrated in FIG. 2. Internal dividers 300 may separate each of the fan openings 202, to separate air flow from each of the plurality of fans into different channels within the light fixture housing 101. Internal dividers 300 in fan housing 201 may maintain separate air flow channels into fan openings 502 as illustrated in FIG. 5. In some embodiments, the light fixture housing 100 may comprise another set of internal dividers, such as dividers 510 shown in FIG. 5 and FIG. 6, to maintain separate air flow channels from the plurality of fans into different channels within the light fixture housing 100, so that air from each fan in the axial row of fans is generally channeled into a single row of LED lighting modules or a single row of drivers. Internal dividers 300 in the fan housing 201 may align with internal dividers 510 in the main section of the light fixture housing 101. FIG. 3 also illustrates various openings in the internal dividers 300 and in the exterior of the fan housing 201, which openings may be used for electrical connection wires, network cables, switches, and the like.

Figure 4:
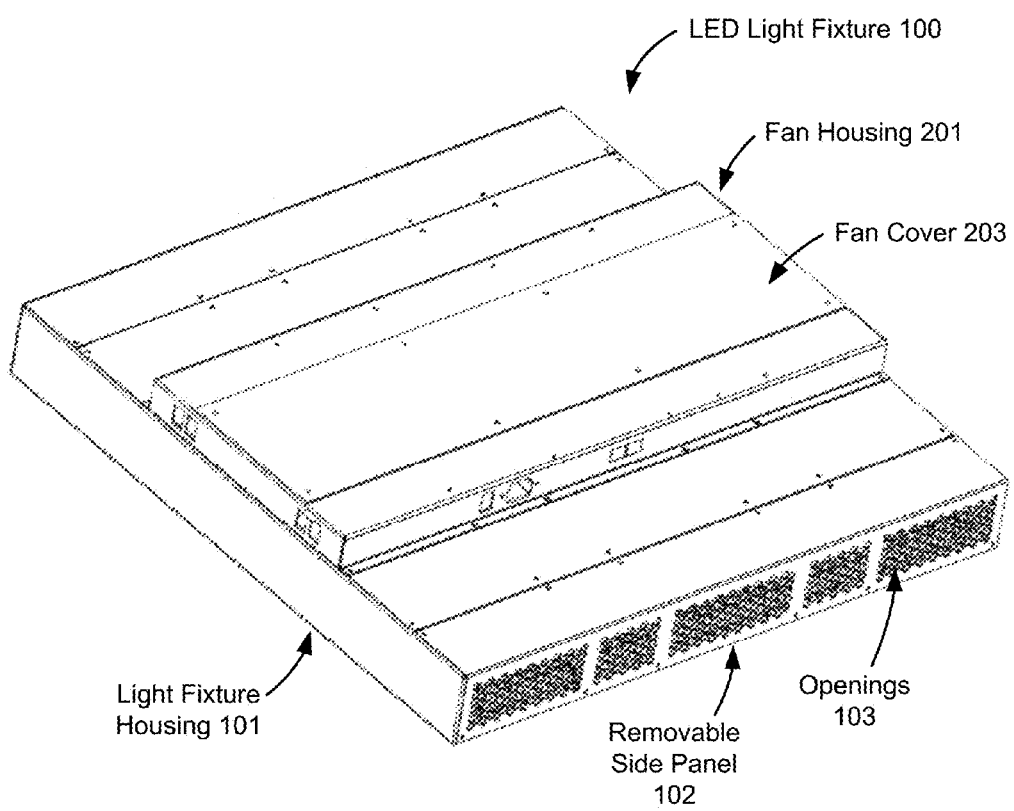
FIG. 4 illustrates a top view of an example LED light fixture.

FIG. 4 illustrates a top view of an example LED light fixture. FIG. 4 illustrates the LED light fixture 100 from FIGS. 1 and 2, and the light fixture housing 101, removable side panel 102, openings 103, and fan housing 201 illustrated in FIGS. 1 and 2 are also visible in FIG. 4. FIG. 4 illustrates a fan cover 203 over the fan openings 202 illustrated in FIG. 2. In some embodiments, fan cover 203 may attachable and removable from fan housing 201. Fan cover 203 may prevent air flow though fan openings 202, e.g., to achieve desired air flow through the light fixture housing 101 in duct cooling mode. In some embodiments, fan cover 203 may be installed on fan housing 201 when the fan cooling system is to be omitted from LED light fixture 100.

FIG. 5 illustrates a top view of an example LED light fixture. FIG. 5 illustrates the LED light fixture 100 from FIGS. 1 and 2, and the light fixture housing 101 is also visible in FIG. 5. In FIG. 5, removable side panels such as removable side panel 102 have been removed, and fan housing 201 has been removed. FIG. 5 illustrates fan openings 502, which may comprise openings in the light fixture housing 101 underneath the fan openings 202 in the fan housing 201. FIG. 5 also illustrates internal dividers such as internal divider 510. Internal divider 510 traverses the LED light fixture 100 to separate or maintain air flow (e.g., air flow produced from the operation of fans or a ventilation duct) into different channels within the light fixture housing 101.

Removable side panel 102, and any other components described herein as removable, may generally be removable and re-attachable using standard tools such as a screwdriver or hex key, or without tools such as through the use of snaps, clips, latches or other structures that may be manipulated by hand. This is in contrast with, e.g., being "permanently" attached using glue, rivets, welds, or other techniques that are not generally reversible using standard tools. In FIG. 5, a removable side panel 102 has been removed from both sides of the LED light fixture 100. Fan housing 201 is also removed from the light fixture housing 101 in FIG. 5, in order to illustrate the fan openings 502, however fan housing 201 need not be "removable" as defined herein.

Figure 8:
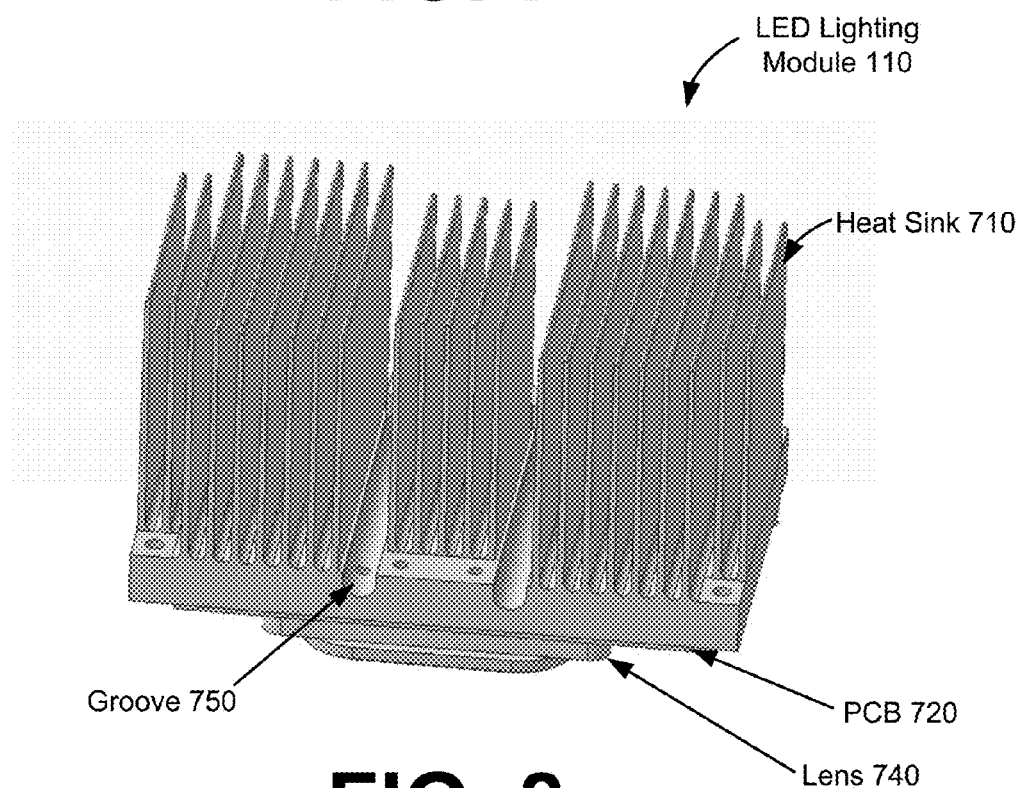
FIG. 8 illustrates a top view of an example LED lighting module.

FIG. 6 illustrates a top view of internals of an example LED light fixture. FIG. 6 illustrates the LED light fixture 100 from FIGS. 1 and 2, and a bottom section of light fixture housing 101 remains visible in FIG. 6. A top section and removable side panels of the light fixture housing 101 are removed in FIG. 6, to allow a view of the internals of the LED light fixture 100. FIG. 6 illustrates a plurality of LED lighting modules 110 arranged within the light fixture housing 101. LED lighting modules 110 are arranged in rows, and each of the rows are separated by two internal dividers 510. Between each group of two internal dividers 510 is a row of drivers 601. A liquid cooling manifold 610, such as illustrated in FIG. 8, is arranged within the light fixture housing 101 so that when liquid intake and liquid expulsion fittings (not shown in FIG. 5) are positioned at corresponding openings in the light fixture housing 101, liquid cooling conduits of the liquid cooling manifold 610 are in thermal communication with heat sinks of the LED lighting modules 110.

In FIG. 6, drivers 601 may be electronically coupled with the LED lighting modules 110. Drivers 601 may comprise different drivers for different frequency outputs of the LED light fixture 100. For example, one or more drivers may drive light output of the LED light fixture 100 in the "red" frequency range, while one or more different drivers may drive light output of the LED light fixture 100 in the "blue" frequency range, and one or more different drivers may drive white light output of the LED light fixture 100. For example, a driver for the "red" frequency output of the light may connect with a circuit that drives the red LEDs of each of the LED lighting modules 110. In some embodiments, the circuit may connect the LEDs of each of the LED lighting modules 110 in series. Large LED light fixtures may comprise multiple drivers and circuits to drive the LEDs of any given frequency range. Each driver may be sized as appropriate for the requirements of its circuit. Drivers 601 may also comprise drivers for fans as appropriate.

Drivers 601 may be electronically coupled with a power input interface for connecting the LED light fixture 100 to electrical power. One or more switches and/or a local controller (not shown in FIG. 6) may control driver output settings for each of the drivers 601, e.g., to control the on/off state of the LED light fixture 100 by controlling the on/off state of each of the drivers 601, to control the overall output intensity of the LED light fixture 100 by controlling the output levels at of each of the drivers 601, and/or to control the relative output intensities of different frequencies of light, by separately adjusting the output levels at of each of the drivers 601.

Figure 7:
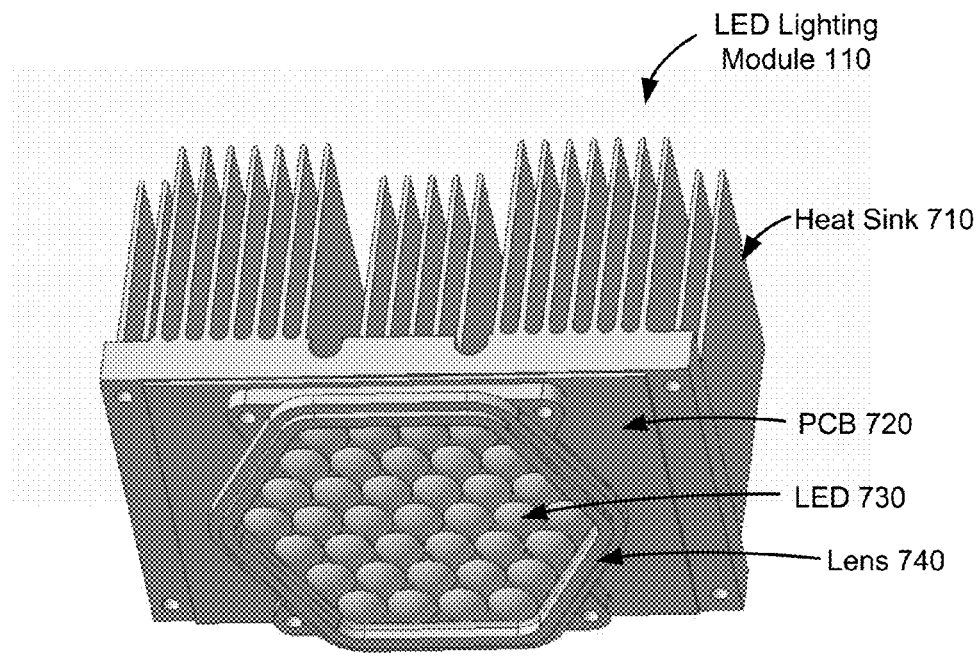
FIG. 7 illustrates a bottom view of an example LED lighting module.

FIG. 7 illustrates a bottom view of an example LED lighting module. LED lighting module 110 includes a heat sink 710, a PCB 720, LEDs such as LED 730 affixed to the PCB 720, and a lens 740 covering the LEDs. In FIG. 7, it will be appreciated that LED 730 is underneath lenses and/or protective coverings provided by lens 740. By referring back to FIG. 1, it can be seen that the light fixture housing 101 may include openings for lenses of LED lighting modules 110, while the PCBs 720 and heat sinks 710 remain inside the light fixture housing 101.

LED lighting module 110 may generally include any technologies known in the art, or technologies as may be developed in the art. LEDs are presently made by several manufacturers in the United States and abroad. While any LEDs may be used in connection with embodiments of this disclosure, it is preferable to select the highest quality LEDs to minimize defects, maximize performance, ensure the longest possible lifespan, and reduce the long-term costs of ownership of the light. Furthermore, to maximize the lifespan and efficiency of LEDs, it is preferable to select LEDs that are designed to sustain power outputs significantly larger than those applied during normal operation of the LED light fixture 100. For example, LED light fixture 100 may include LEDs designed to sustain a 600 Watt light output, however LED light fixture 100 may be adapted to operate at 400 Watts or less. The term "significantly larger" as used herein in this context refers to around 10% larger or more.

Each LED lighting module 110 may include LEDs 730 of various different frequencies, such as red, blue, and white. The specific frequencies and the numbers of LEDs 730 at each frequency may be tailored to the application for which the LED light fixture 100 is to be used. LEDs 730 of each frequency may be connected, via PCB 720, to a driver circuit for that frequency. Thus, different LEDs 730 within the LED lighting module 110 may be coupled with different driver circuits.

It will be appreciated by those of skill in the art that each of LEDs 730 may comprise an individual lens element (not shown in FIG. 7). The individual lens elements may be covered by the lens 740. Light from each of LEDs 730 may thus pass through two lenses. The angle of light output by the LED lighting module 110 is affected by the combination of the individual lens elements and the lens 740. LED lighting module 110 may be adapted to produce any desired light output angle, e.g., by choosing a lens 740 with the desired output angle properties. In some embodiments, manufacturing processes may include receiving a customer light output angle selection, and affixing, to LED lighting modules 110, lenses 740 adapted to produce the selected light output angle.

FIG. 8 illustrates a top view of an example LED lighting module. FIG. 8 illustrates the LED lighting module 110 shown in FIG. 7, and the heat sink 710, PCB 720, and lens 740 remain at least partially visible in FIG. 8. FIG. 8 shows grooves 750 traversing a center section of the heat sink 710. Grooves 750 may be arranged to accommodate liquid cooling conduits of a liquid cooling manifold 610. Liquid cooling conduits may be placed in thermal communication with the heat sink 710 by contact between outer surfaces of the liquid cooling conduits and the grooves 750 traversing the heat sink 710. To achieve good thermal communication, a diameter of the grooves 750 may substantially match a diameter of the outer surface of the liquid cooling conduits.

Figure 9:
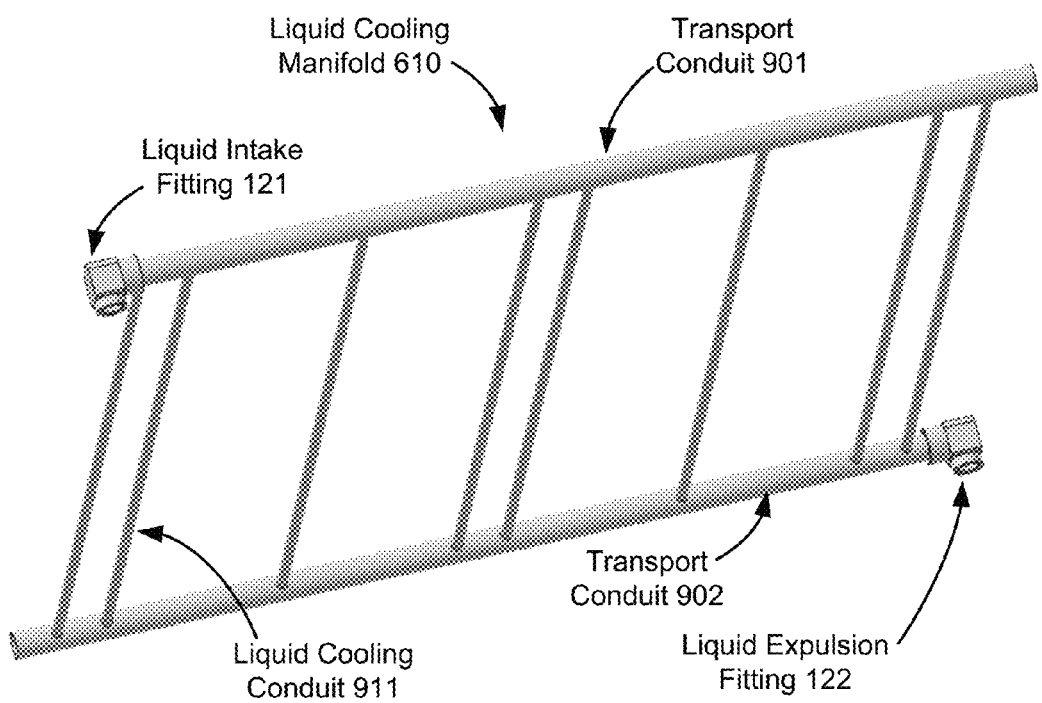
FIG. 9 illustrates an example liquid cooling manifold.

FIG. 9 illustrates an example liquid cooling manifold. Liquid cooling manifold 610 comprises a first transport conduit 901, a second transport conduit 902, and liquid cooling conduits 911 connecting the first and second transport conduits 901 and 902. The first and second transport conduits 901 and 902 are arranged in parallel, and have a proximal end, e.g., at left, and a distal end, e.g., at right. A liquid intake fitting 121 is positioned at the proximal end of the first transport conduit 901, and a liquid expulsion fitting 122 is positioned at the distal end of the second transport conduit 902.

The liquid cooling manifold 610 may be watertight, so that liquid may enter and exit the liquid cooling manifold 610 only through the liquid intake and expulsion fittings 121 and 122. The liquid cooling manifold may be arranged so that when the liquid intake and liquid expulsion fittings 121 and 122 are positioned at corresponding openings in the light fixture housing 101, as shown in FIG. 1, the liquid cooling conduits are in thermal communication with the heat sinks of the LED lighting modules within the LED light fixture 100, as shown in FIG. 10.

In arrangements comprising parallel aligned first and second transport conduits 901 and 902 and multiple liquid cooling conduits 911 aligned perpendicular to the first and second transport conduits 901 and 902, as shown in FIG. 9, liquid entering the liquid cooling manifold 610 at the liquid intake fitting 121 travels through two or more liquid cooling conduits 811 to the liquid expulsion fitting 122, so that liquid entering the liquid cooling manifold 610 at the liquid intake fitting 121 travels a same distance to the liquid expulsion fitting 122 via any of the two or more liquid cooling conduits 911. Those of skill in the art will appreciate that other designs, such as parallelogram-type designs may also produce the effect of liquid traveling a same distance through multiple liquid cooling conduits of a liquid cooling manifold. Such arrangements may advantageously provide uniform cooling through the multiple liquid cooling conduits 911. Also, a diameter of the first and second transport conduits 901 and 902 of liquid cooling manifold 610 is larger than a diameter of liquid cooling conduits 911. Larger diameter transport conduits 901 and 902 may be adapted to accommodate a liquid flow rate through transport conduits 901 and 902 which substantially matches or exceeds the liquid flow rate accommodated by the combined liquid cooling conduits 911.

The liquid cooling manifold 610 is preferably made of materials with good thermal conductivity, such as copper and/or other metals. In some embodiments, liquid cooling conduits 911 may be made of different material and/or have different thermal conductivity than first and second transport conduits 901 and 902. For example, liquid cooling conduits 911 may be made of thinner, more thermally conductive material, while first and second transport conduits 901 and 902 may optionally be made of thicker and/or less thermally conductive material. In some embodiments, liquid cooling manifold 610 may be a one-piece manifold, e.g., where the connections between second transport conduits 901 and 902 and liquid cooling conduits 911 are welded, not detachable, and as a result, watertight with a high degree of confidence.

Figure 10:
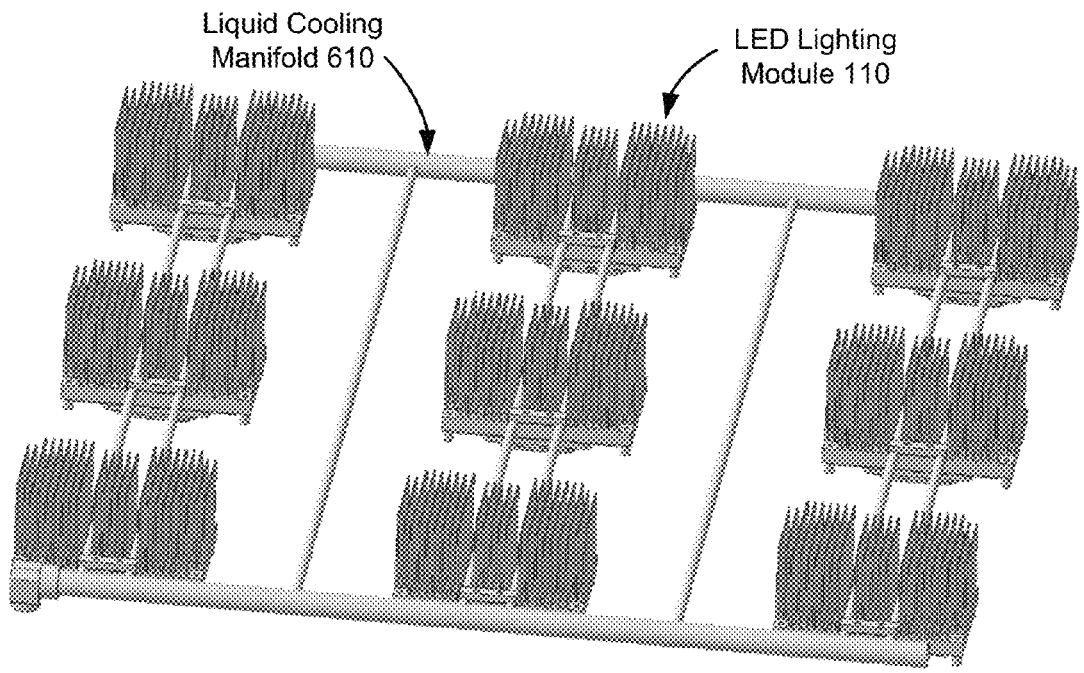
FIG. 10 illustrates an example liquid cooling manifold with liquid cooling conduits in thermal communication with heat sinks of LED lighting modules.

FIG. 10 illustrates an example liquid cooling manifold with liquid cooling conduits in thermal communication with heat sinks of LED lighting modules. FIG. 10 illustrates the liquid cooling manifold 610 shown in FIG. 9, and FIG. 10 illustrates an example arrangement whereby the liquid cooling manifold 610 may be arranged with liquid cooling conduits in thermal communication with multiple heat sinks of multiple corresponding LED lighting modules 110. In FIG. 10, two liquid cooling conduits are in thermal communication with the heat sinks of each of three rows of LED lighting modules. Each of the two liquid cooling conduits per row make contact between outer surfaces of the liquid cooling conduits and grooves traversing the center sections of the heat sinks. The diameter of the grooves substantially matches the diameter of the outer surfaces of the liquid cooling conduits, to increase thermal contact there between. Precision manufacturing of the liquid cooling manifold 610 may be used to achieve sufficiently exact spacing between liquid cooling conduits, to line up with the heat sink grooves.

The example arrangement of FIG. 10 illustrates additional liquid cooling conduits positioned between the rows of LED lighting modules 110. The additional liquid cooling conduits may placed in thermal communication with drivers 601, as will be understood by reference to FIG. 6. In some embodiments, manufacturing processes for LED light fixture 100 may include, inter alia, first positioning multiple LED lighting modules 110 in the light fixture housing 101, subsequently positioning the liquid cooling manifold 610 in the light fixture housing 101 with liquid cooling conduits 911 in thermal communication with multiple LED lighting modules 110 and with liquid intake fitting 121 and liquid expulsion fitting 122 positioned over corresponding openings in the light fixture housing 101, and subsequently positioning drivers 601 in the light fixture housing 101, so that drivers 601 are also in thermal communication with liquid cooling conduits 911.

Figure 11:
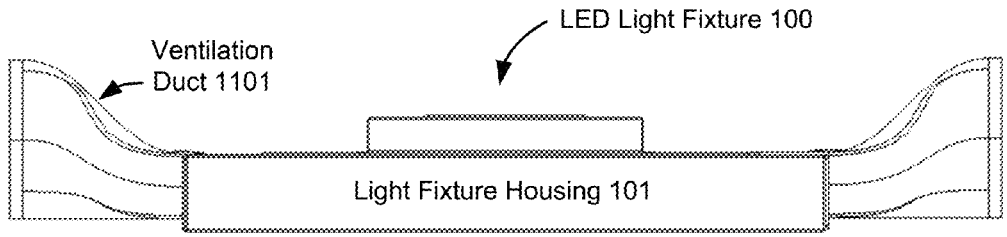
FIG. 11 illustrates an example LED light fixture with ventilation ducts in a substantially horizontal orientation.

FIG. 11 illustrates an example LED light fixture with ventilation ducts in a substantially horizontal orientation. LED light fixture 100 may comprise light fixture housing 101 with ventilation ducts 1101 extending horizontally from each of two opposite sides of the light fixture housing 101. In some embodiments, ventilation ducts 1101 may be permanently attached and/or integrated with light fixture housing 101. In some embodiments, ventilation ducts 1101 may be removably attached to light fixture housing 101, e.g., using removable fasteners. The light fixture housing 101 may comprise removable side panels 102, such as illustrated in FIG. 2, and the ventilation ducts 1101 may comprise ventilation duct attachments adapted to attach to the light fixture housing 1101 in place of the removable side panels 102.

Figure 12:
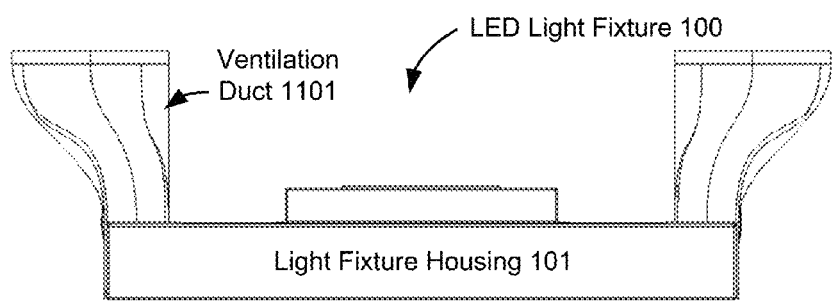
FIG. 12 illustrates an example LED light fixture with ventilation ducts in a substantially vertical orientation.

FIG. 12 illustrates an example LED light fixture with ventilation ducts in a substantially vertical orientation. LED light fixture 100 may comprise light fixture housing 101 with ventilation ducts 1101 extending vertically from each of two opposite sides of the light fixture housing 101. As described above in connection with FIG. 11, in some embodiments, ventilation ducts 1101 may be permanently attached and/or integrated with light fixture housing 101. In some embodiments, ventilation ducts 1101 may be removably attached to light fixture housing 101, e.g., using removable fasteners. The ventilation ducts 1101 may comprise ventilation duct attachments adapted to attach to the light fixture housing 1101 in place of the removable side panels 102.

Figure 14:
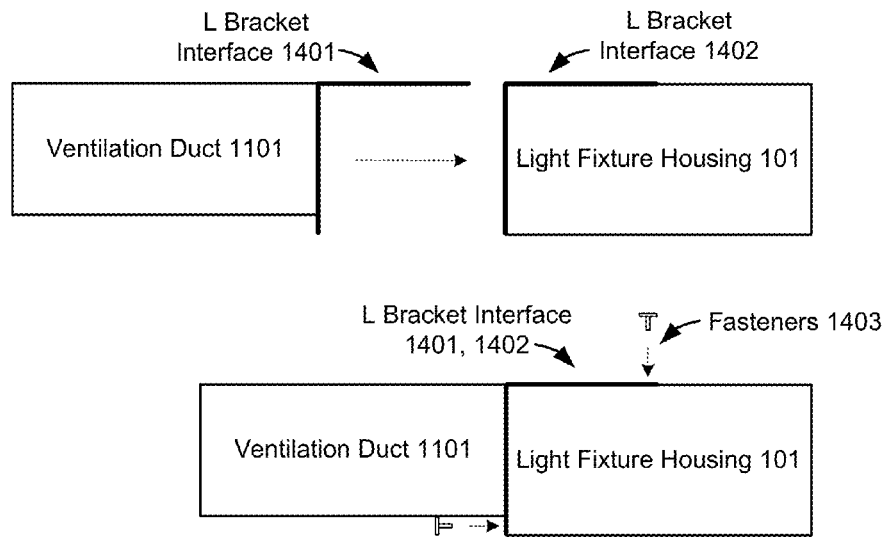
FIG. 14 illustrates an example ventilation duct coupling with a light fixture housing in a substantially horizontal orientation, wherein the ventilation duct and light fixture housing are also adapted to couple in a substantially vertical orientation.
Figure 15:
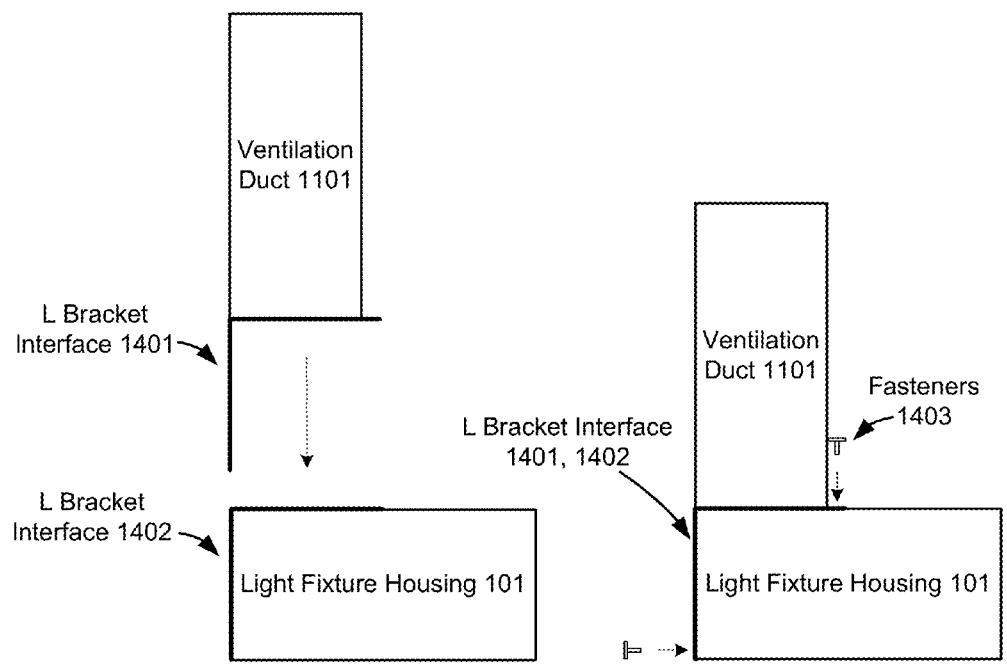
FIG. 15 illustrates an example ventilation duct coupling with a light fixture housing in a substantially vertical orientation, wherein the ventilation duct and light fixture housing are also adapted to couple in a substantially horizontal orientation.

In some embodiments, the ventilation ducts 1101 may be adapted to couple with the light fixture housing 101 in a substantially horizontal orientation, as shown in FIG. 11, as well as in a substantially vertical orientation, as shown in FIG. 12. In other words, the ventilation ducts 1101 and light fixture housing 101 may be configured to allow attachable and detachable coupling of ventilation ducts 1101 and light fixture housing 101 in both horizontal and vertical orientations, in a manner that forms substantially airtight connections between ventilation ducts 1101 and light fixture housing 101, in both horizontal and vertical orientations. For example, in some embodiments, ventilation ducts 1101 may comprise L bracket interfaces which adapt the ventilation ducts 1101 to couple with the light fixture housing 101 in a substantially horizontal orientation as well as in a substantially vertical orientation, as illustrated in FIG. 14 and FIG. 15. L bracket interfaces are one example arrangement that allows both horizontal and vertical coupling, and those of skill in mechanical design will appreciate with the benefit of this disclosure that other arrangements are also possible.

Figure 13:
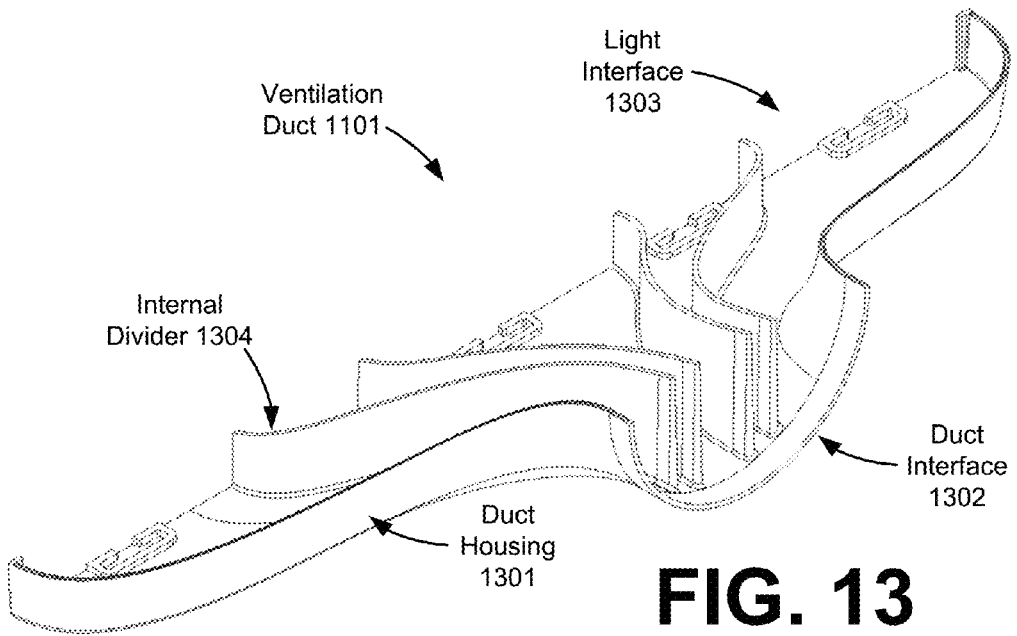
FIG. 13 illustrates an internal view of an example ventilation duct.

FIG. 13 illustrates an internal view of an example ventilation duct. Example ventilation duct 1101 may comprise a contoured duct housing 1301 having a duct interface 1302 and a light interface 1303. One or more internal dividers 1304 may be positioned inside the duct housing 1301. The duct interface 1302 may comprise an interface adapted to connect to an air duct, e.g., a round or rectangular air duct adapted to transport air between lights, or from an air source to a first light in a series of lights, or from a last light in the series of lights to an air exhaust. The light interface 1303 may comprise an interface adapted to connect to a light fixture housing 101. The internal dividers 1304 may be adapted separate air flow into two or more channels as shown. The internal dividers 1304 may be adapted to align, at the light interface 1303, with internal dividers 510 to maintain air flow, within the LED light fixture 100, in the two or more separate channels established at the ventilation duct 1101.

FIG. 14 illustrates an example ventilation duct coupling with a light fixture housing in a substantially horizontal orientation, wherein the ventilation duct and light fixture housing are also adapted to couple in a substantially vertical orientation. FIG. 14 includes, at top, a ventilation duct 1101 comprising an L bracket interface 1401, and a light fixture housing 101 with an L bracket interface 1402. The ventilation duct 1101 and L bracket interface 1401 may be moved into contact with the light fixture housing 101 and L bracket interface 1402, as shown at bottom. The L bracket interfaces 1401, 1402 may be fastened together, e.g., with fasteners 1403 to couple the ventilation duct 1101 and the light fixture housing 101.

In some embodiments, the L bracket interface 1401 may extend along the length of the light interface 1303 illustrated in FIG. 13. The L bracket interface 1401 may be formed of a lip along one edge of the light interface 1303, and a horizontal extension along an opposite edge of the light interface 1303. The lip and horizontal extension may comprise openings to accommodate fasteners 1403. The L bracket interface 1401 may also comprise openings for air flow through each of the channels established by the internal dividers 1304.

In some embodiments, the L bracket interface 1402 may comprise openings for fasteners 1403. These openings may be located, e.g., on internal dividers 510 and/or on light fixture housing 101. These openings may be located to match the positions of fastener openings on L bracket interface 1401, when the interfaces 1401 and 1402 are mated together. In some embodiments, the openings for fasteners 1403 may be equidistant from a corner of the light fixture housing 101, to allow for re-orienting the ventilation duct 1101 between vertical and horizontal orientations, while using same openings for fasteners 1403. In other words, openings on the top of the light fixture housing 101 may be a same distance from the top left corner of the light fixture housing 101, as illustrated in FIG. 14, as openings on the side of the light fixture housing 101.

FIG. 15 illustrates an example ventilation duct coupling with a light fixture housing in a substantially vertical orientation, wherein the ventilation duct and light fixture housing are also adapted to couple in a substantially horizontal orientation. FIG. 15 includes, at left, a ventilation duct 1101 comprising an L bracket interface 1401, and a light fixture housing 101 with an L bracket interface 1402. The ventilation duct 1101 and L bracket interface 1401 may be moved into contact with the light fixture housing 101 and L bracket interface 1402, as shown at right. The L bracket interfaces 1401, 1402 may be fastened together, e.g., with fasteners 1403 to couple the ventilation duct 1101 and the light fixture housing 101.

In some embodiments, the ventilation duct 1101 may attachable and detachable from the light fixture housing 101 in the substantially horizontal orientation, as illustrated in FIG. 14. Similarly, the ventilation duct 1101 may attachable and detachable from the light fixture housing 101 in the substantially vertical orientation, as illustrated in FIG. 15. The ventilation duct 1101 may be rotated 180 degrees when moved from the horizontal to the vertical orientation or vice versa.

Figure 16:
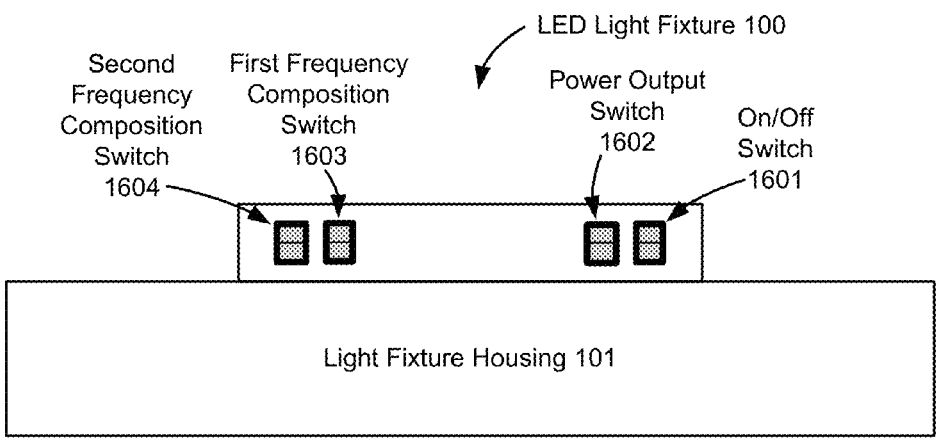
FIG. 16 illustrates an example LED light fixture comprising a plurality of switches for controlling the LED light fixture.
Figure 17:
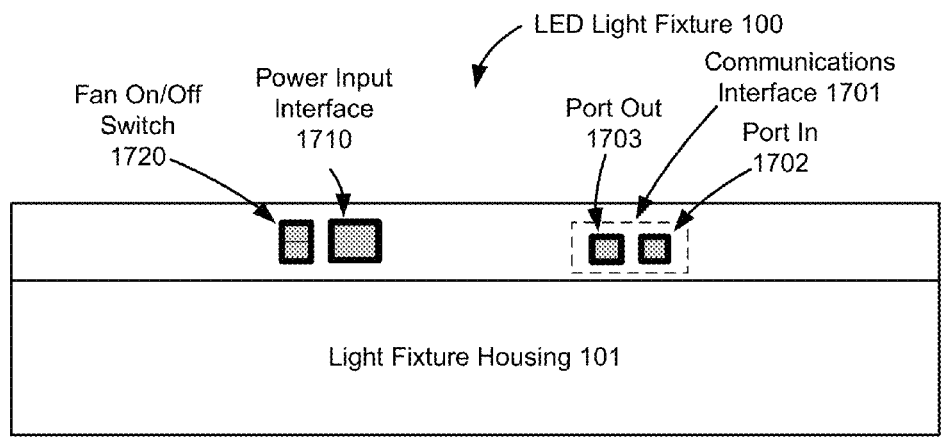
FIG. 17 illustrates an example LED light fixture comprising a switch, a power input interface, and a communications interface.

FIG. 16 provides an end view of an example LED light fixture, and FIG. 17 provides a side view of the example LED light fixture. FIG. 16 illustrates example LED light fixture 100, comprising a plurality of switches for controlling the LED light fixture 100. FIG. 17 illustrates example LED light fixture 100, comprising a switch, a power input interface, and a communications interface. The example switches illustrated in FIG. 16 and FIG. 17 include an on/off switch 1601 for turning the LED light fixture 100 on and off, a power output switch 1602 for switching the LED light fixture 100 between a low power state and a high power state, a first frequency composition switch 1603 for switching the LED light fixture 100 between a white light mode and a grow light mode, a second frequency composition switch 1604 for switching the LED light fixture 100 between a blue biased vegetative growth mode and a red biased flowering mode, and a fan on/off switch 1720, illustrated in FIG. 17, for turning on and off one or more fans within the LED light fixture 100.

In some embodiments, the example switches, power input interface, and communications interface may be integrated into the light fixture housing 101, e.g., as shown in FIGS. 16 and 17, or elsewhere on the fan housing portion or main housing portion of the light fixture housing 101. In other embodiments, the example switches may be, e.g., included in a wired or wireless control unit for the LED light fixture 100, and the power input interface and/or communications interface may be attached to the LED light fixture 100 via cords or cables. It will be appreciated that in some embodiments, LED light fixture 100 may include fewer switches or additional switches; while in some embodiments switches in LED light fixture 100 may consist only of those switches illustrated in FIGS. 16 and 17, or any subset of the illustrated switches. Also, it will be appreciated that switches may be implemented as hardware switches as illustrated, or as software switches accessible, e.g., by a touch screen interface.

The on/off switch 1601 may be adapted to simultaneously turn and off all LED lighting modules 110 included in the LED light fixture 100. The fan on/off switch 1720 may be adapted to simultaneously turn and off all fans included in the LED light fixture 100. In some embodiments, the on/off switch 1601 may be adapted to simultaneously turn and off all LED lighting modules 110 and fans included in the LED light fixture 100 so long as the fan on/off switch 1720 remains in the "on" state. When the fan on/off switch 1720 remains in the "off" state, the on/off switch 1601 may operate to turn and off only the LED lighting modules 110 in the LED light fixture 100, while the fans remain off.

The power output switch 1602 for switching the LED light fixture 100 between a low power state and a high power state may, for example, switch the LED light fixture 100 between a substantially half (50%) power state and a substantially full (100%) power state. The full power state may comprise any desired power level up to and including the maximal power output sustainable by the LED lighting modules 110. In some embodiments, the full power state may comprise a power level less than the maximal power output sustainable by the LED lighting modules 110. In some embodiments, the maximal power output sustainable by the LED lighting modules 110 may be significantly larger than the power level at the full power state, as described herein. The half power state may comprise a power level that is, e.g., anywhere from 40-60% of the full power state. In some embodiments, the power output switch 1602 may comprise different or more power settings, e.g., 25%, 50%, 75%, and 100%, or 33%, 66%, and 100%.

The first frequency composition switch 1603 for switching the LED light fixture 100 between a white light mode and a grow light mode may, for example, activate one or more white-light LEDs to switch the LED light fixture 100 into white light mode, and deactivate the one or more white-light LEDs to switch the LED light fixture 100 into grow light mode. In some embodiments, the first frequency composition switch 1603 may also deactivate one or more "color" LEDs, such as red and blue frequency LEDs, in white light mode, and the first frequency composition switch 1603 may activate the color LEDs in grow light mode. In some embodiments, the first frequency composition switch 1603 may adjust relative power of white-light LEDs and color LEDs, without turning the white-light LEDs and color LEDs completely on and/or completely off in white light mode and grow light mode.

The second frequency composition switch 1604 for switching the LED light fixture 100 between a blue biased vegetative growth mode and a red biased flowering mode may, for example, adjust relative power of color LEDs of different frequencies. For example, in the blue biased vegetative growth mode, power to blue-frequency LEDs may be increased, power to red-frequency LEDs may be decreased, or both. In the red biased flowering mode, power to red-frequency LEDs may be increased, power to blue-frequency LEDs may be decreased, or both. In some embodiments, the second frequency composition switch 1604 may comprise more than two settings, e.g., switch 1604 may include one or more intermediate settings between the blue biased vegetative growth mode and the red biased flowering mode.

The communications interface 1701 may comprise an interface for at least one communications cable for communications between an external controller and a local controller adapted to control the LED light fixture 100 responsive to instructions received from the external controller. The illustrated communications interface 1701 comprises a "port in" input interface 1702 and a "port out" output interface 1703. The input interface 1702 may be adapted to receive an input cable and the local controller may receive, via input interface 1702, inbound communications from the external controller to the LED light fixture 100. The output interface 1703 may be adapted to receive an output cable and the local controller may provide, via output interface 1703, outbound communications to the external controller. Communications interface 1701 may comprise, e.g., an RS 485 type interface. Communications cables, local controllers, and external controller may similarly implement RS 485 type network communications protocol in some embodiments.

It will be appreciated that a variety of communications interfaces have been developed and may be suitable for use in connection with embodiments of this disclosure. Some communications interfaces may employ one single interface for a single communications cable, which transmits both inbound and outbound communications. Some communications interfaces may employ separate input and output interfaces as illustrated in FIG. 17.

The power input interface 1710 may comprise, e.g., an Alternating Current (AC) power socket. The power input interface 1710 may implement any standard interface for the location in which the LED light fixture 100 is to be used. An LED light fixture 100 for use in North America may implement the NEMA 5 North American standard, for 120 volts at a frequency of 60 Hz. An LED light fixture 100 for use in Europe may implement the CEE 7 European standard, for 220-240 volts at 50 Hz.

Figure 18:
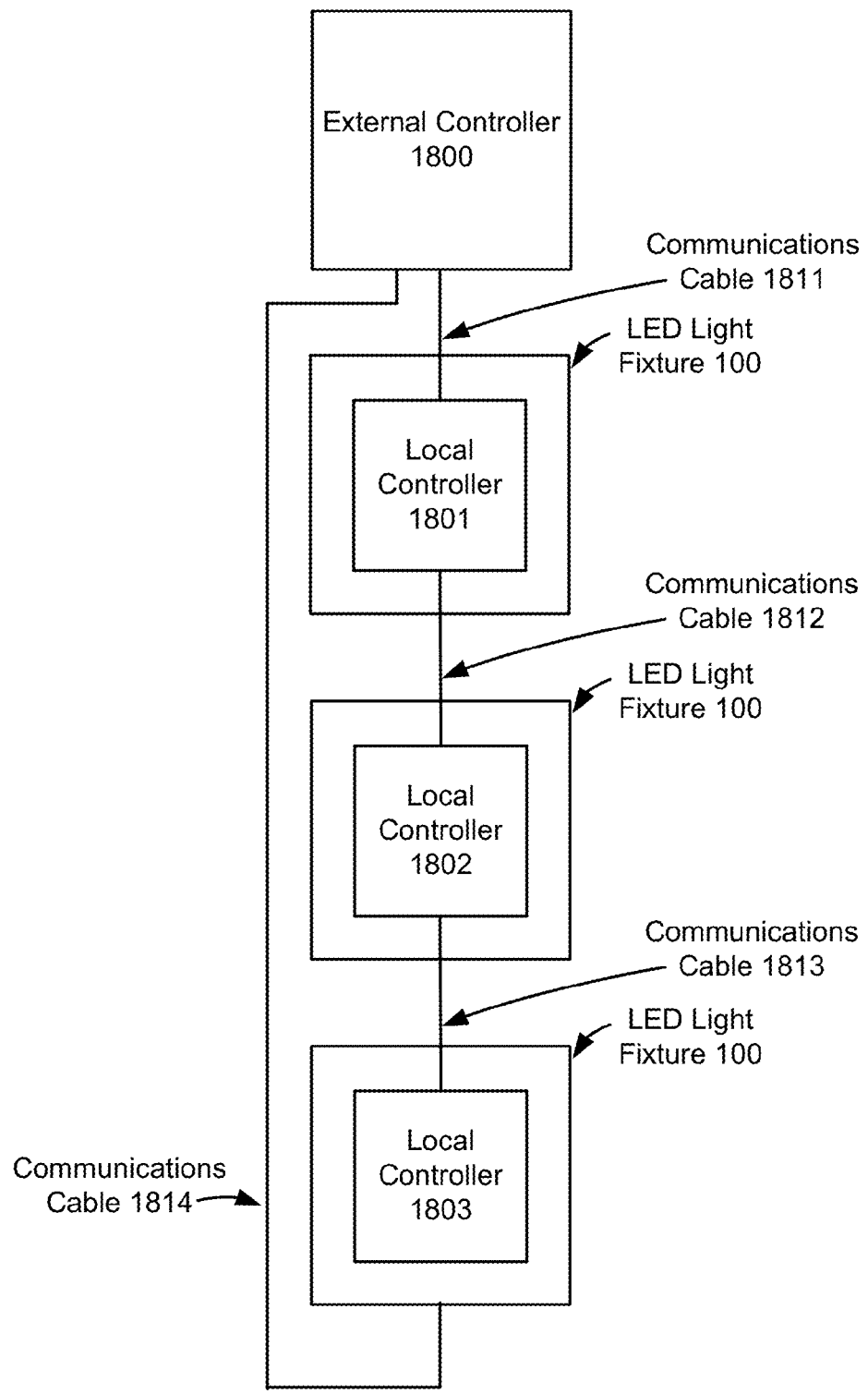
FIG. 18 illustrates an example circuit comprising an external controller and a plurality of LED light fixtures, each LED light fixture comprising a local controller adapted to control the LED light fixture responsive to instructions received from the external controller.

FIG. 18 illustrates an example circuit comprising an external controller and a plurality of LED light fixtures, each LED light fixture comprising a local controller adapted to control the LED light fixture responsive to instructions received from the external controller. In FIG. 18, external controller 1800 is coupled via communications cable 1811 with local controller 1801 in a first LED light fixture 100. Local controller 1801 is coupled via communications cable 1812 with local controller 1802 in a next LED light fixture 100. Local controller 1802 is coupled via communications cable 1813 with local controller 1803 in a next LED light fixture 100. Local controller 1803 is coupled via communications cable 1814 with external controller 1800. FIG. 18 illustrates three LED light fixtures 100, however, it will be appreciated that more or fewer LED light fixtures 100 may be included, as needed to meet the lighting requirements of different sized deployments.

In FIG. 18, each of the communications cables 1811-1814 may connect an output interface at a previous device to an input interface at a subsequent device. Thus communications cable 1811 may connect an output interface at external controller 1800 to an input interface coupled with local controller 1801. Communications cable 1812 may connect an output interface at local controller 1801 to an input interface coupled with local controller 1802. Communications cable 1813 may connect an output interface at local controller 1802 to an input interface coupled with local controller 1803. Communications cable 1814 may connect an output interface at local controller 1803 to an input interface coupled with external controller 1800. Each of the communications cables 1811-1814 may thus comprise both an output cable for a previous device, and an input cable for a subsequent device. An arrangement such as illustrated in FIG. 18 may implement an RS 485 type network protocol for communications between devices. It will be appreciated that other arrangements for communications cables, or wireless communications, may be suitable for communications between external controller 1800 and local controllers 1801-1803 to implement the technologies described herein.

In FIG. 18, external controller 1800 may provide instructions to LED light fixtures 100 by sending instructions via communications cable 1811. Each of the local controllers 1801-1803 may be adapted control its respective LED light fixture 100 according to received instructions, and to relay or otherwise pass on the instructions to downstream local controllers. The instructions may contain identical instructions for use by each of the LED light fixtures 100, or the instructions may contain different instructions for one or more different LED light fixtures 100.

Also, each of the local controllers 1801-1803 may be adapted to provide status information for its respective LED light fixture 100 to the external controller 1800 via its output interface and output cable. The local controllers 1801-1803 may be adapted to relay or otherwise pass on status information, so that all status information is provided to the external controller 1800. For example, local controllers 1801-1803 may be adapted to receive status information for any upstream LED light fixtures, and local controllers 1801-1803 may be adapted to relay the received status information to a next LED light fixture or else to the external controller 1800.

In FIG. 18, each of the local controllers 1801-1803 may be adapted to control its respective LED light fixture 100, responsive to instructions received from the external controller 1800 via the communications cables 1811-1813. For example, each of local controllers 1801-1803 may be electronically coupled with at least one driver in its respective LED light fixture 100, and each of local controllers 1801-1803 may, inter alia, adjust the drivers in its respective LED light fixture 100, according to instructions received from the external controller 1800, to control its respective LED light fixture 100. Furthermore, each of the local controllers 1801-1803 may be adapted to relay or otherwise pass on instructions received from the external controller 1800, via downstream communications cables, to downstream LED light fixtures 100.

In some embodiments, each of the local controllers 1801-1803 may be adapted to provide status information for its respective LED light fixture 100 to the external controller 1800 via the communications cables 1812-1814. Status information may include, e.g., information indicating whether an LED light fixture 100 is fully operational or, alternatively, if an LED light fixture 100 needs service or has experienced a malfunction. It will be appreciated that status information may further include information of any desired level of detail. Each of communications cables 1812-1814, respectively, may serve as an output cable coupled to an output interface for each of local controllers 1801-1803, respectively. Each of the local controllers 1801-1803 may be adapted to receive, via its respective input cable 1811-1813, status information for one or more other, upstream LED light fixtures 100. Each of the local controllers 1801-1803 may be adapted to relay received status information for the one or more other, upstream LED light fixtures 100, via its respective output interface and output cable.

Figure 19:
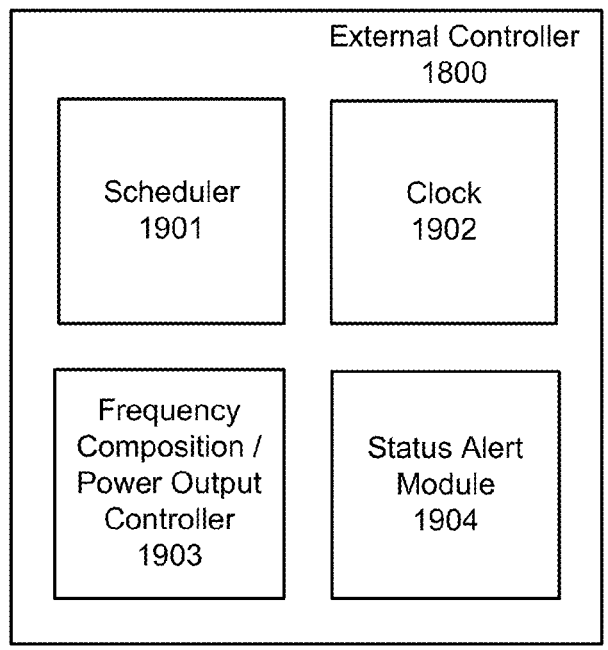
FIG. 19 illustrates an example external controller.

FIG. 19 illustrates an example external controller. External controller 1800 may include, inter alia, a scheduler 1901, a clock 1902, a frequency composition/power output controller 1903, and a status alert module 1904. External controller 1800 may generally comprise any of a variety of controller or computer types, using any hardware, software or firmware suitable to implement the functions described herein. It will be understood that, in addition to the illustrated components, external controller 1800 may include a processor, a memory having computer readable instructions implementing elements 1901-1904, a display, communication interfaces for communicating with local controllers, and a user input device such as a keypad, mouse, or touch screen for interacting with users.

In FIG. 19, scheduler 1901 may be adapted to receive user scheduling settings indicating when LED light fixtures 100 are to be turned on and off. Scheduling settings may generally allow for any desired on/off times. In some embodiments, scheduler 1901 may allow for entry of several different programs including different on/off times. External controller 1800 may be adapted to store the different programs in a memory and may allow user selection of a desired program. Clock 1902 may provide a current time of day. External controller 1800 may be adapted to send on and off instructions to LED light fixtures 100 when clock 1902 reaches scheduled on/off times.

Frequency composition/power output controller 1903 may be adapted to receive user frequency composition and power output settings to be applied at LED light fixtures 100. For example, frequency composition/power output controller 1903 may allow for selection of percentage levels for each frequency available at LED light fixtures 100, and a percentage level for overall power output at LED light fixtures 100, in 1% increments. Thus a user may select, for example, 60% Red, 60% Blue, 10% White, and a power output of 50%. The external controller 1800 may be adapted to calculate resulting instructions for the LED light fixtures 100. In this example, the resulting instructions may be effective to implement 30% Red, 30% Blue, and 5% White at the LED light fixtures 100, to achieve the selected frequency composition power levels, adjusted by the selected power output level. It will be appreciated with the benefit of this disclosure that a variety of other approaches may be used to implement frequency composition/power output controller 1903.

In some embodiments, frequency composition/power output controller 1903 may allow for entry of several different frequency composition/power output programs. External controller 1800 may be adapted to store the different programs in a memory, and may allow user selection of a desired program. When the external controller 1800 turns the LED light fixtures 100 on and off according to the scheduling settings, the external controller 1800 may apply the frequency composition/power output settings selected using the frequency composition/power output controller 1903. External controller 1800 may be adapted to provide on and off instructions to the LED light fixtures 100, as well as power level instructions for each frequency available at the LED light fixtures 100.

In some embodiments, external controller 1800 may be adapted to include, e.g., as a selectable option in scheduler 1901, or in frequency composition/power output controller 1903, or by default, a sunrise simulator which instructs the LED light fixtures 100 to gradually raise, when turning the LED light fixtures 100 on, power levels up to the levels calculated from user-entered frequency composition/power output settings. Conversely, a sunset simulator may instruct the LED light fixtures 100 to gradually lower, when turning the LED light fixtures 100 off, power levels down to off. In some embodiments, the sunrise simulator may be adapted to increase the red frequency power levels first, or faster, than the blue frequency power levels. Conversely, the sunset simulator may be adapted to decrease the blue frequency power levels first, or faster, than the red frequency power levels.

Status alert module 1905 may be adapted to alert a user of any malfunction, error, or adverse status reported by any of LED light fixtures 100. For example, status alert module 1905 may read incoming status information from LED light fixtures 100. If incoming status information includes adverse status information, status alert module 1905 may flash a warning on an external controller 1800 display. The warning may or may not identify the specific error or LED light fixture involved.

Figure 20:
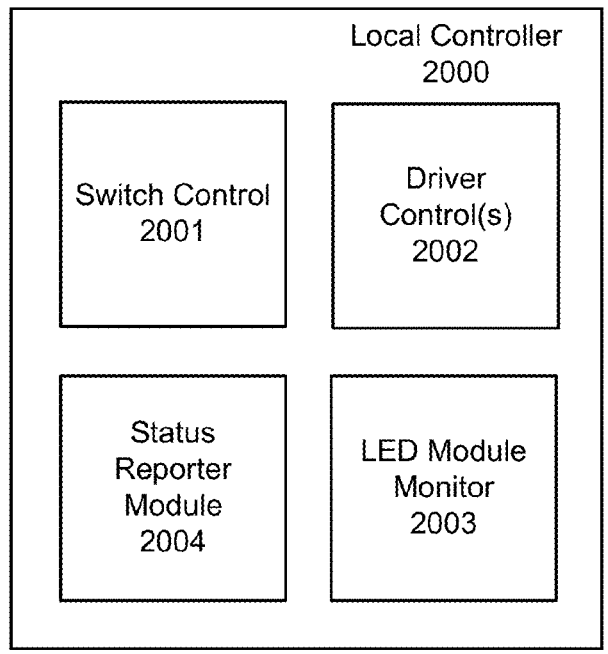
FIG. 20 illustrates an example local controller.

FIG. 20 illustrates an example local controller. Local controller 2000 may serve as any of the local controllers 1801-1803 illustrated in FIG. 18. Local controller 2000 may include, inter alia, a switch control 2001, driver control(s) 2002, an LED module monitor 2003, and a status reporter module 2004. Local controller 2000 may generally comprise any of a variety of controller or computer types, using any hardware, software or firmware suitable to implement the functions described herein. It will be understood that, in addition to the illustrated components, local controller 2000 may include a processor, a memory having computer readable instructions implementing elements 2001-2004, and communication interfaces for communicating with other local controllers and/or the external controller 1800. In addition to the illustrated blocks, local controller 2000 may be adapted to relay external controller instructions and status information from other local controllers as described herein.

In FIG. 20, switch control 2001 may be adapted to detect when local controller 2000 is coupled with external controller 1800, and to deactivate switches such as switches 1601-1604 and/or switch 1720 when local controller 2000 is coupled with external controller 1800. When switches 1601-1604 and/or switch 1720 are deactivated, the LED light fixture 100 is not controllable by any deactivated switches, and is instead controllable from external controller 1800. Thus for example, toggling the on/off switch 1601, when local controller 2000 is coupled with external controller 1800, may not affect the on/off state of the LED light fixture 100. The local controller 2000 may be adapted to automatically override one or more local switch settings using the instructions received from the external controller 1800.

Conversely, switch control 2001 may be adapted to detect when local controller 2000 is not coupled with external controller 1800, or when external controller 1800 is off, and switch control 2001 may be adapted to activate switches such as switches 1601-1604 and/or switch 1720 when local controller 2000 is not coupled with external controller 1800 or when external controller 1800 is off. Thus for example, toggling the on/off switch 1601, when local controller 2000 is decoupled from external controller 1800, may again be effective to toggle the on/off state of the LED light fixture 100.

Driver control(s) 2002 may be adapted to adjust drivers in the LED light fixture 100 according to instructions received from external controller 1800 (when external controller 1800 is coupled with local controller 2000) or according to switch settings from switches such as 1603, 1604 (when local controller 2000 is not coupled with external controller 1800). In some embodiments, driver control(s) 2002 may include a driver control 2002 for each driver in the LED light fixture 100. Driver control(s) 2002 may for example adjust driver power output levels according to switch settings or received external controller 1800 instructions. For example, instructions received from the external controller 1800 may comprise instructions to apply designated power output levels at multiple different drivers corresponding to multiple different frequency outputs of the LED light fixture 100, and driver control(s) 2002 may be adapted to apply the designated power output levels at each of the multiple different drivers. Local controller 200 may process incoming instructions for example by providing each received power output level to a corresponding driver control among driver control(s) 2002.

LED module monitor 2003 may be adapted to monitor status of LED lighting modules 110 included in the LED light fixture 100. For example, in some embodiments, PCBs 720 may be adapted to report status information to LED module monitor 2003. Drivers 601 may also be adapted to report status information to LED module monitor 2003. LED module monitor 2003 may be adapted to control the LED light fixture 100 based on received LED lighting module 110 and/or driver 601 status.

In some embodiments, PCBs 720 may comprise thermometers, and PCBs 720 may be adapted to monitor temperatures in LED lighting modules 110. A PCB 720 may be adapted to automatically shut of a LED lighting module 110 in response to a high temperature. The PCB 720 may report the high temperature and/or shut off event to the LED module monitor 2003. The PCB 720 may be adapted to automatically return the LED lighting module 110 to an "on" state in response to a return to a low temperature, or after a period of time from the high temperature shut off. The high temperature, low temperature, and/or period of time may be set at any predetermined levels, e.g., based on design temperatures for LEDs 730 in the LED lighting module 110. Similarly, a driver 601 may be adapted to turn the driver 601 off and back on in response to high temperature events, and to report status information to LED module monitor 2003.

In some embodiments, the LED module monitor 2003 may be adapted to control the LED light fixture 100 based on LED lighting module 110 and/or driver 601 status for example by counting LED lighting module 110 and/or driver 601 shut off events, and shutting off the LED light fixture 100 when a threshold number of shut off events is reached. The LED module monitor 2003 may count shut off events individually for the different LED lighting modules 110 and/or drivers 601 in the LED light fixture 100, or the LED module monitor 2003 may aggregate shut off events for all LED lighting modules 110 and/or drivers 601 in the LED light fixture 100. In some embodiments, the LED module monitor 2003 may apply a time window such as a preceding 2 minutes, 5 minutes, 10 minutes, or other time interval, so that only recent shut off events are counted. It will be appreciated that the local controller 2000 may be adapted to automatically turn off the LED light fixture 100 in response to high temperatures in the LED light fixture 100 according to a variety of other approaches, such as by turning off the LED light fixture 100 in response to a high temperature in the LED light fixture 100 as a whole, or in response to any single high temperature in a LED lighting module 110.

The status reporter module 2004 may be adapted to report status information to external controller 1800 by reporting, e.g., events wherein the LED light fixture 100, or any individual LED lighting module 110 or driver 601 therein, has been shut off due to high temperature event. In some embodiments, status information reported to external controller 1800 may be limited, e.g., to events wherein the LED light fixture 100 as a whole has been shut off by LED module monitor 2003 due to multiple high temperature events at LED lighting modules 110 therein. The local controller 2000 may generally be adapted to automatically notify the external controller 1800 of any high temperature in the LED light fixture 100 as desired for particular embodiments. In some embodiments, the local controller 2000 may report other status information, such as total service hours, service schedule information, status of individual components in the LED light fixture 100, etc.

Figure 21:
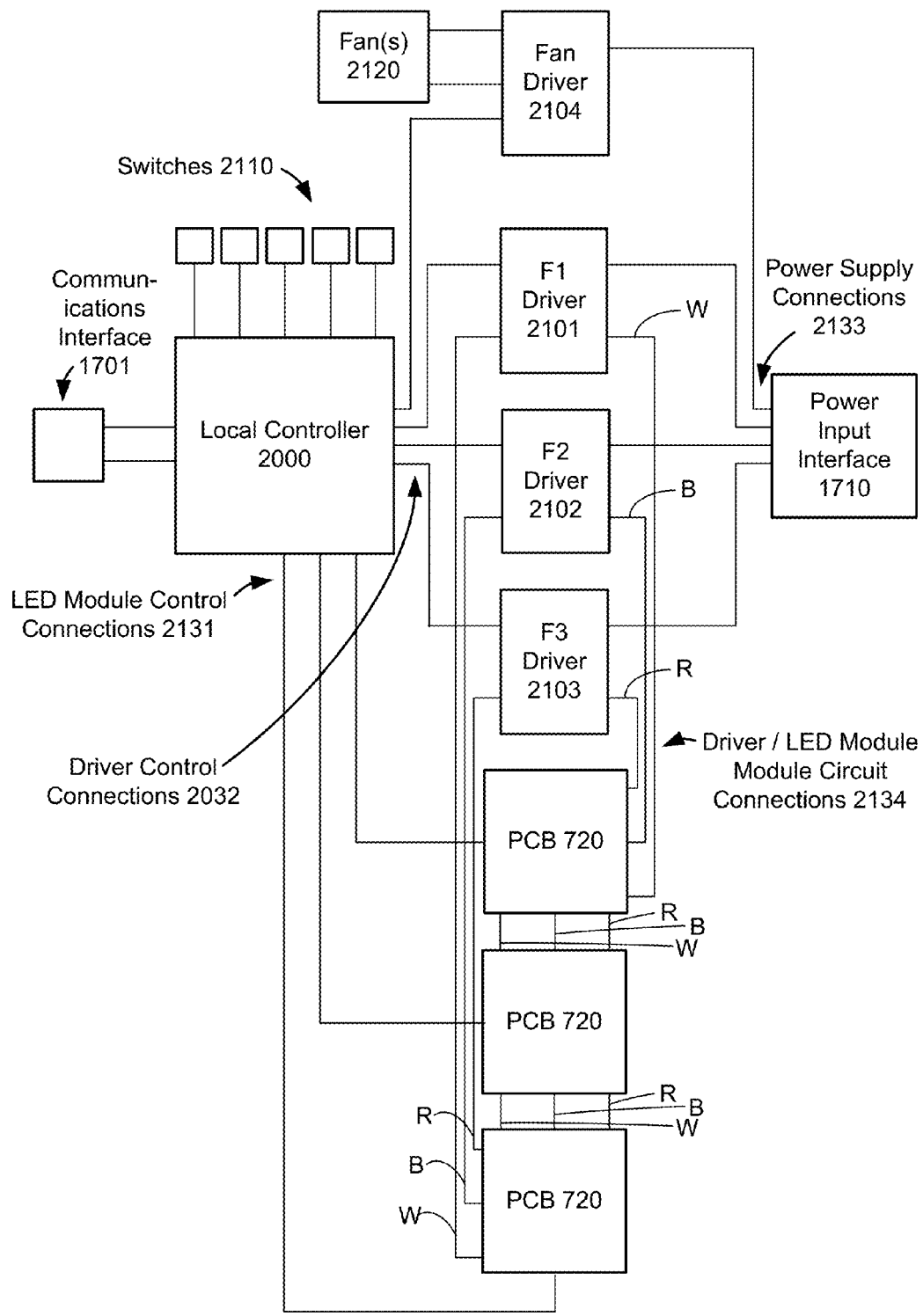
FIG. 21 illustrates example electronic components and connections in a LED light fixture.

FIG. 21 illustrates example electronic components and connections in a LED light fixture. FIG. 21 provides, inter alia, connections between components which may be used to implement the functions of local controller 2000 described in connection with FIG. 20. FIG. 21 includes communications interface 1701, local controller 2000, switches 2110, fan driver 2104, fans 2120, frequency 1 (F1) driver 2101, frequency 2 (F2) driver 2102, frequency 3 (F3) driver 2103, three example PCBs 720, and power input interface 1710.

In FIG. 21, local controller 2000 is coupled with PCBs 720 via LED module control connections 2131. Local controller 2000 is coupled with drivers 2101-2104 via driver control connections 2032. Power input interface 1710 is coupled with drivers 2101-2104 via power supply connections 2133. Also, connections between local controller 2000 and communications interface 1701, local controller 2000 and switches 2110, and fan driver 2104 and fans 2120 are illustrated. An additional power supply connection (not shown in FIG. 21) may couple local controller 2000 with power input interface 1710.

Each of drivers 2101-2103 is coupled with each of PCBs 720 in series, via driver/LED module circuit connections 2134. Driver/LED module circuit connections 2134 comprise an example Red (R) circuit for driver 2101, a Blue (B) circuit for driver 2102, and White (W) circuit for driver 2103. Driver 2101 drives the R circuit comprising red LEDs at PCBs 720. Driver 2102 drives the B circuit comprising blue LEDs at PCBs 720; and driver 2103 drives the W circuit comprising white LEDs at PCBs 720. Three example frequencies and three example PCBs 720 are illustrated, however it will be appreciated that additional frequencies and corresponding additional drivers and PCBs 720 may be included in some embodiments.

In FIG. 21, switches 2110 may comprise, e.g., switches 1601-1604 and 1720. The local controller 2000 may receive instructions from an external controller 1800 via communications interface 1701. Driver control connections 2032 may allow driver adjustment by driver control(s) 2002 in the local controller 2000. LED module control connections 2131 may allow status reporting from LED lighting modules 110 comprising PCBs 720 to local controller 2000, e.g., for processing by LED module monitor 2003. In some embodiments, local controller 2000 may optionally also control individual LED lighting modules 110 by LED module control connections 2131, e.g., by turning individual LED lighting modules 110 on or off. The local controller 2000 may report status information to external controller 1800 via communications interface 1701.

The use of hardware or software, e.g., in local controller 2000 and external controller 1800 is generally a design choice representing cost vs. efficiency tradeoffs. There are various vehicles by which processes and/or systems and/or other technologies described herein may be effected (e.g., hardware, software, and/or firmware), and the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that some embodiments of the subject matter described herein may comprise recordable media such as a floppy disk, a hard disk drive, a Compact Disc (CD), a Digital Video Disk (DVD), a digital tape, a computer memory, etc.

The foregoing detailed description has set forth various embodiments of the devices and/or processes via the use of illustrations and examples. Insofar as such illustrations and examples contain one or more functions and/or operations, it will be understood by those within the art that each function and/or operation may be implemented, individually and/or collectively, by a wide range of manufacturing approaches, usage techniques, hardware, software, firmware, or virtually any combination thereof.

While certain example apparatus and techniques have been described herein, those skilled in the art will appreciate that modifications may be made, and equivalents may be substituted, without departing from claimed subject matter. Additionally, many modifications may be made to adapt described apparatus and methods to particular situations without departing from the central concepts and teachings described herein. Therefore, it is intended that claimed subject matter not be limited to the particular examples disclosed, but that such claimed subject matter also may include all implementations falling within the scope of the appended claims, and equivalents thereof.

The invention claimed is:

1. A Light Emitting Diode (LED) light fixture equipped with a cooling system, comprising:
    a light fixture housing;
    at least one LED lighting module within the light fixture housing, wherein the at least one LED lighting module comprises a heat sink, a Printed Circuit Board (PCB), LEDs affixed to the PCB, and a lens covering the LEDs;
    wherein the light fixture housing comprises an opening for the lens of the at least one LED lighting module;
    at least one driver within the light fixture housing and electronically coupled with the at least one LED lighting module;
    a power input interface electronically coupled with the driver;
    a cooling system comprising a watertight liquid cooling manifold within the light fixture housing, wherein the liquid cooling manifold comprises:
        a liquid intake fitting and a liquid expulsion fitting;
        a first transport conduit with a proximal end and a distal end, wherein the liquid intake fitting is positioned at the proximal end of the first transport conduit
        a second transport conduit with a proximal end and a distal end, wherein the second transport conduit is aligned parallel with the first transport conduit such that the proximal end of the second transport conduit is at a same side of the liquid cooling manifold as the proximal end of the first transport conduit, and the distal end of the second transport conduit is at a same side of the liquid cooling manifold as the distal end of the first transport conduit, and wherein the liquid expulsion fitting is positioned at the distal end of the second transport conduit; and two or more liquid cooling conduits connecting the first and second transport conduits so that liquid entering the manifold at the liquid intake fitting travels through the two or more liquid cooling conduits to the liquid expulsion fitting, and so that liquid entering the manifold at the liquid intake fitting travels a same distance to the liquid expulsion fitting via any of the two or more liquid cooling conduits;

wherein the light fixture housing comprises an opening for the liquid intake fitting, and an opening for the liquid expulsion fitting; and wherein the liquid cooling manifold is arranged so that when the liquid intake and liquid expulsion fittings are positioned at corresponding openings in the light fixture housing, the at least one liquid cooling conduit is in thermal communication with the heat sink of the at least one LED lighting module.

2. The LED light fixture of claim 1, wherein a diameter of the first and second transport conduits is larger than a diameter of the two or more liquid cooling conduits.

3. The LED light fixture of claim 1, wherein at least one of the two or more liquid cooling conduits is in thermal communication with the heat sink of the at least one LED lighting module by contact between an outer surface of the at least one liquid cooling conduit and a groove traversing a center section of the heat sink, and wherein a diameter of the groove substantially matches a diameter of the outer surface of the at least one liquid cooling conduit.

4. The LED light fixture of claim 1, wherein the two or more liquid cooling conduits are made of copper.

5. The LED light fixture of claim 1, wherein the two or more liquid cooling conduits are in thermal communication with two or more heat sinks of a corresponding two or more LED lighting modules.

6. The LED light fixture of claim 1, further comprising at least one fan within the light fixture housing, wherein the light fixture housing comprises an opening over the at least one fan, wherein the at least one fan is positioned substantially above the heat sink of at least one LED lighting module, and wherein the light fixture housing comprises one or more openings along at least one side of the light fixture housing to allow air flow from the opening over the at least one fan, across the heat sink, and out the one or more openings along at least one side of the light fixture housing.

7. The LED light fixture of claim 6, further comprising a plurality of fans within the light fixture housing, wherein the plurality of fans are arranged in an axial row of fans across a middle section of the light fixture housing.

8. The LED light fixture of claim 7, further comprising at least one internal divider to separate air flow from the plurality of fans into different channels within the light fixture housing.

9. The LED light fixture of claim 1, further comprising a ventilation duct extending from a side of the light fixture housing.

10. The LED light fixture of claim 9, wherein the light fixture housing comprises at least one removable side panel, and wherein the ventilation duct comprises a ventilation duct attachment adapted to attach to the light fixture housing in place of the at least one removable side panel.

11. The LED light fixture of claim 9, wherein the ventilation duct is adapted to couple with the light fixture housing in a substantially horizontal orientation as well as in a substantially vertical orientation.

12. The LED light fixture of claim 11, wherein the ventilation duct comprises an L bracket interface which adapts the ventilation duct to couple with the light fixture housing in a substantially horizontal orientation as well as in a substantially vertical orientation.

13. The LED light fixture of claim 9, wherein the ventilation duct comprises at least one internal divider to separate air flow into two or more channels.

14. The LED light fixture of claim 13, wherein the light fixture housing comprises at least one internal divider to maintain air flow, within the LED light fixture, in the two or more separate channels established at the ventilation duct.

15. A Light Emitting Diode (LED) light fixture equipped with a cooling system, comprising:
a light fixture housing;
at least one LED lighting module within the light fixture housing, wherein the at least one LED lighting module comprises a heat sink, a Printed Circuit Board (PCB), LEDs affixed to the PCB, and a lens covering the LEDs;
wherein the light fixture housing comprises an opening for the lens of the at least one LED lighting module;
at least one driver within the light fixture housing and electronically coupled with the at least one LED lighting module;
a power input interface electronically coupled with the driver;
a cooling system comprising a watertight liquid cooling manifold within the light fixture housing, wherein the liquid cooling manifold comprises:
at least one liquid cooling conduit, a liquid intake fitting, and a liquid expulsion fitting;
wherein the light fixture housing comprises an opening for the liquid intake fitting, and an opening for the liquid expulsion fitting; and
wherein the liquid cooling manifold is arranged so that when the liquid intake and liquid expulsion fittings are positioned at corresponding openings in the light fixture housing, the at least one liquid cooling conduit is in thermal communication with the heat sink of the at least one LED lighting module; and
a plurality of switches, comprising:
an on/off switch for turning the LED light fixture on and off;
a fan on/off switch for turning one or more fans within the LED light fixture on and off;
a power output switch for switching the LED light fixture between a low power state and a high power state;
a first frequency composition switch for switching the LED light fixture between a white light mode and a grow light mode; and
a second frequency composition switch for switching the LED light fixture between a blue biased vegetative growth mode and a red biased flowering mode.

16. A Light Emitting Diode (LED) light fixture equipped with a cooling system, comprising:
a light fixture housing;
at least one LED lighting module within the light fixture housing, wherein the at least one LED lighting module comprises a heat sink, a Printed Circuit Board (PCB), LEDs affixed to the PCB, and a lens covering the LEDs;
wherein the light fixture housing comprises an opening for the lens of the at least one LED lighting module;

at least one driver within the light fixture housing and electronically coupled with the at least one LED lighting module;

a power input interface electronically coupled with the driver;

a cooling system comprising a watertight liquid cooling manifold within the light fixture housing, wherein the liquid cooling manifold comprises:

at least one liquid cooling conduit, a liquid intake fitting, and a liquid expulsion fitting;

wherein the light fixture housing comprises an opening for the liquid intake fitting, and an opening for the liquid expulsion fitting; and wherein the liquid cooling manifold is arranged so that when the liquid intake and liquid expulsion fittings are positioned at corresponding openings in the light fixture housing, the at least one liquid cooling conduit is in thermal communication with the heat sink of the at least one LED lighting module; and a local controller, wherein:

the local controller is electronically coupled with the at least one driver;

the local controller is electronically coupled with at least one communications interface adapted to receive at least one communications cable;

the local controller is adapted to control the LED light fixture responsive to instructions received from an external controller via the at least one communications cable; and the local controller is adapted to provide status information for the LED light fixture to the external controller via the at least one communications cable.

17. The LED light fixture of claim 16, wherein:

the at least one communications interface comprises an input interface and an output interface;

the at least one communications cable comprises an input cable and an output cable;

the local controller is adapted to control the LED light fixture responsive to instructions received from the external controller via the input cable and input interface;

the local controller is adapted to provide status information for the LED light fixture to the external controller via the output interface and output cable;

the local controller is adapted to receive status information for one or more other LED light fixtures via the input cable and input interface; and the local controller is adapted to relay the instructions received from the external controller, as well as status information for the one or more other LED light fixtures, via the output interface and output cable.

18. The LED light fixture of claim 16, wherein:

the local controller is adapted to automatically turn off the LED light fixture in response to a high temperature in the LED light fixture; and the local controller is adapted to automatically notify the external controller via the at least one communications cable of the high temperature in the LED light fixture.

19. The LED light fixture of claim 16, wherein the local controller is adapted to automatically override one or more local switch settings using the instructions received from the external controller.

20. The LED light fixture of claim 16, wherein the instructions received from the external controller comprise instructions to:

turn the LED light fixture on or off; and apply designated power output levels at multiple different drivers corresponding to multiple different frequency outputs of the LED light fixture.

21. A Light Emitting Diode (LED) light fixture equipped with a cooling system, comprising:

a light fixture housing;

at least one LED lighting module within the light fixture housing, wherein the at least one LED lighting module comprises a heat sink, a Printed Circuit Board (PCB), LEDs affixed to the PCB, and a lens covering the LEDs;

wherein the light fixture housing comprises an opening for the lens of the at least one LED lighting module;

at least one driver within the light fixture housing and electronically coupled with the at least one LED lighting module;

a power input interface electronically coupled with the driver;

a cooling system comprising two or more of:

a watertight liquid cooling manifold within the light fixture housing, wherein the liquid cooling manifold comprises a liquid intake fitting positioned at a first side of the light fixture housing, and a liquid expulsion fitting positioned at a side of the light fixture housing which is opposite the first side;

ventilation duct attachments extending from opposite sides of the light fixture housing, wherein the ventilation duct attachments couple with a duct cooling system comprising a multi-light duct cooling circuit, and wherein the ventilation duct attachments attach to the light fixture housing in place of at least one removable side panel of the light fixture housing; or a plurality of fans within the light fixture housing and at least one internal divider to separate air flow from each of the plurality of fans into a different respective channel within the light fixture housing, wherein the light fixture housing comprises a respective opening over each of the plurality of fans, wherein each of the plurality of fans is positioned substantially above a respective heat sink of at least one LED lighting module, and wherein the light fixture housing comprises one or more openings along at least one side of the light fixture housing, such that each of the plurality of fans drives air flow from its respective opening, through its respective channel, across its respective heat sink, and out the one or more openings along at least one side of the light fixture housing.

22. A Light Emitting Diode (LED) light fixture equipped with a cooling system, comprising:

a light fixture housing;

at least one LED lighting module within the light fixture housing, wherein the at least one LED lighting module comprises a heat sink, a Printed Circuit Board (PCB), LEDs affixed to the PCB, and a lens covering the LEDs;

wherein the light fixture housing comprises an opening for the lens of the at least one LED lighting module;

at least one driver within the light fixture housing and electronically coupled with the at least one LED lighting module;

a power input interface electronically coupled with the driver;

the cooling system comprising ventilation duct attachments extending from opposite sides of the light fixture housing, wherein the ventilation duct attachments couple with a duct cooling system comprising a multi-light duct cooling circuit, and wherein the ventilation duct attachments couple with the light fixture housing in a substantially horizontal orientation as well as in a substantially vertical orientation;

and a plurality of fans within the light fixture housing and at least one internal divider to separate air flow from each of the plurality of fans into a different respective channel within the light fixture housing, wherein the light fixture housing comprises a respective opening over each of the plurality of fans, wherein each of the plurality of fans is positioned substantially above a respective heat sink of at least one LED lighting module, and wherein the light fixture housing comprises one or more openings along at least one side of the light fixture housing, such that each of the plurality of fans drives air flow from its respective opening, through its respective channel, across its respective heat sink, and out the one or more openings along at least one side of the light fixture housing.

* * * * *